June 1, 1948.  A. DABRASKY ET AL  2,442,401
FUSE SETTER AND RAMMER

Filed Jan. 27, 1943  11 Sheets-Sheet 1

INVENTORS
August Dabrasky
William V. Goodline
Galen M. Taylor
By their attorney

June 1, 1948. A. DABRASKY ET AL 2,442,401
FUSE SETTER AND RAMMER
Filed Jan. 27, 1943 11 Sheets-Sheet 4

June 1, 1948.　　A. DABRASKY ET AL　　2,442,401
FUSE SETTER AND RAMMER
Filed Jan. 27, 1943　　11 Sheets-Sheet 5
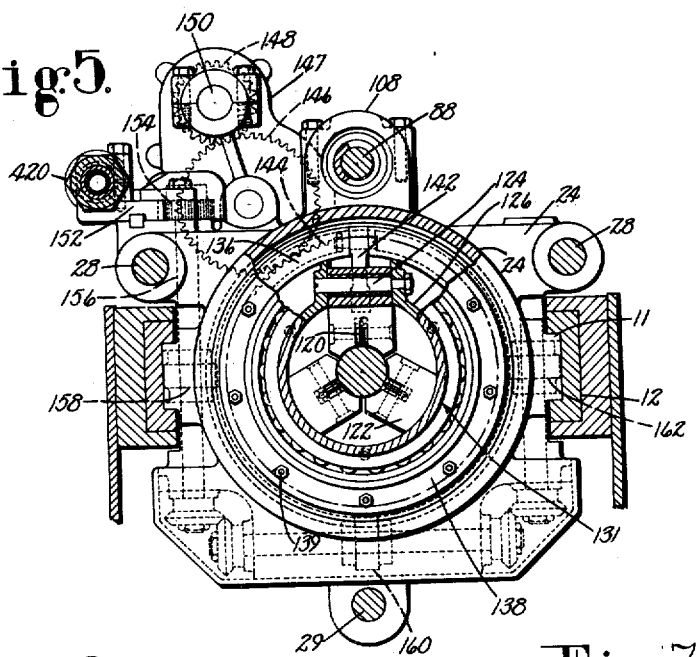
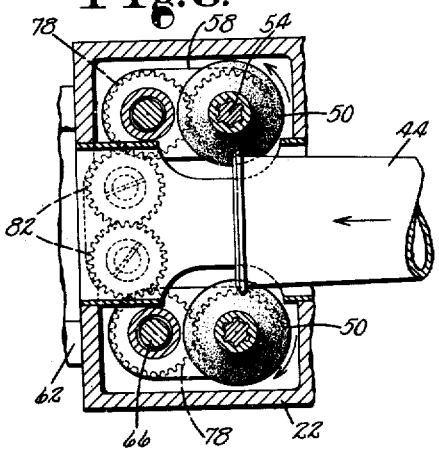 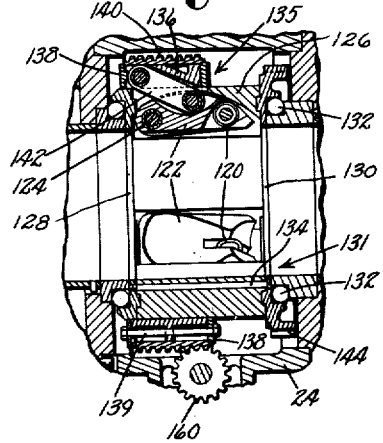
INVENTORS

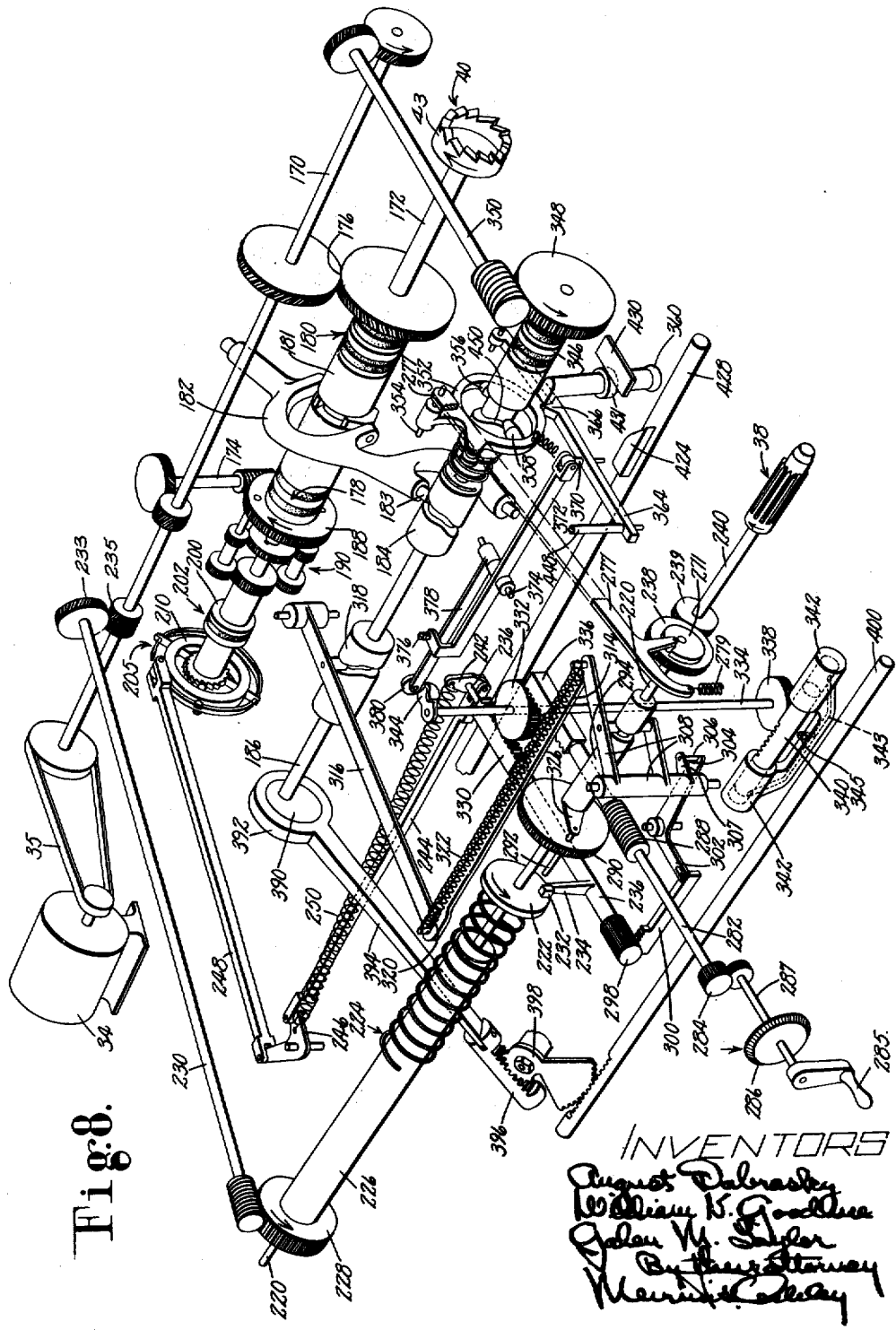

June 1, 1948.  A. DABRASKY ET AL  2,442,401
FUSE SETTER AND RAMMER
Filed Jan. 27, 1943  11 Sheets-Sheet 7

INVENTORS

June 1, 1948. A. DABRASKY ET AL 2,442,401
FUSE SETTER AND RAMMER
Filed Jan. 27, 1943 11 Sheets-Sheet 8

INVENTORS

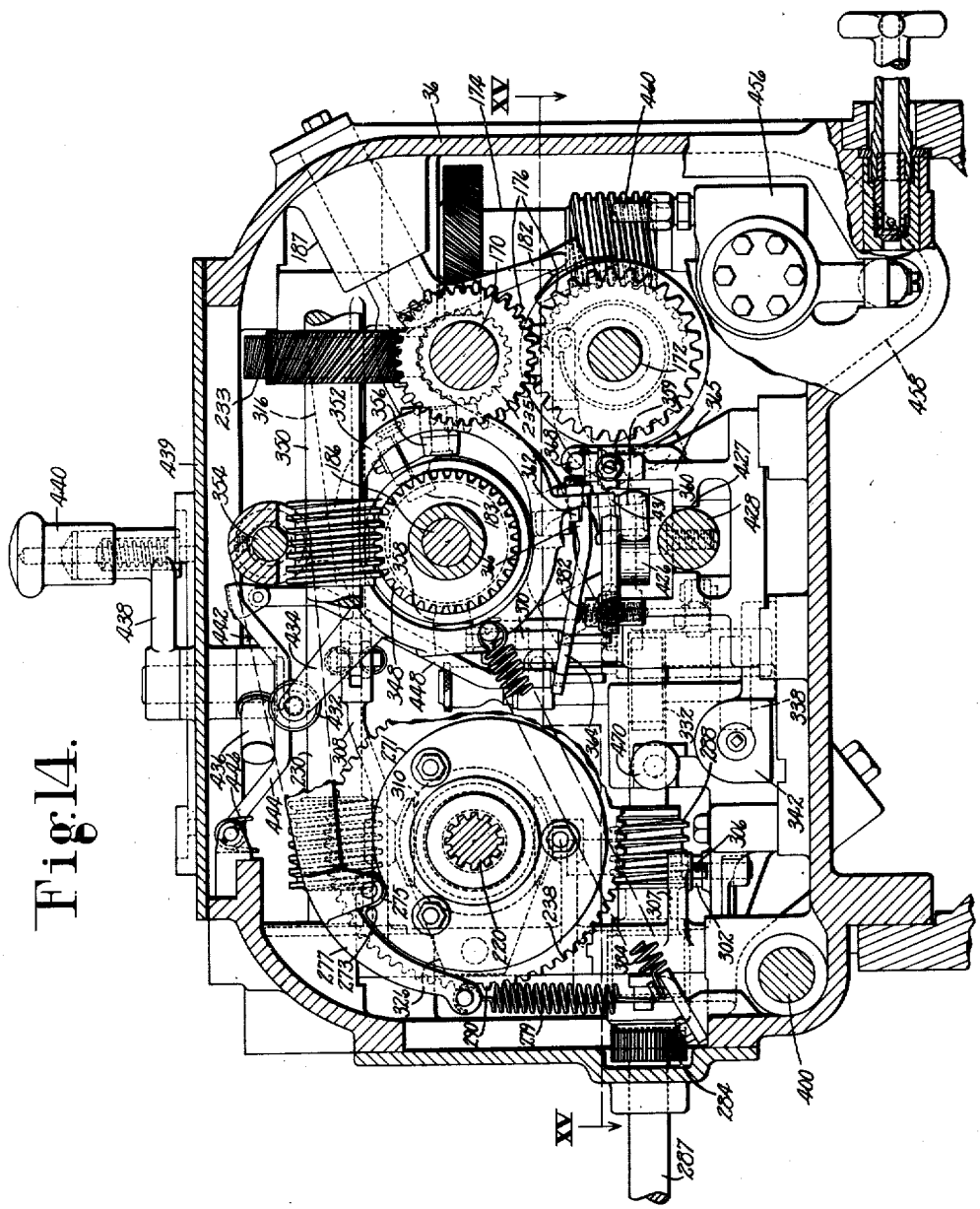

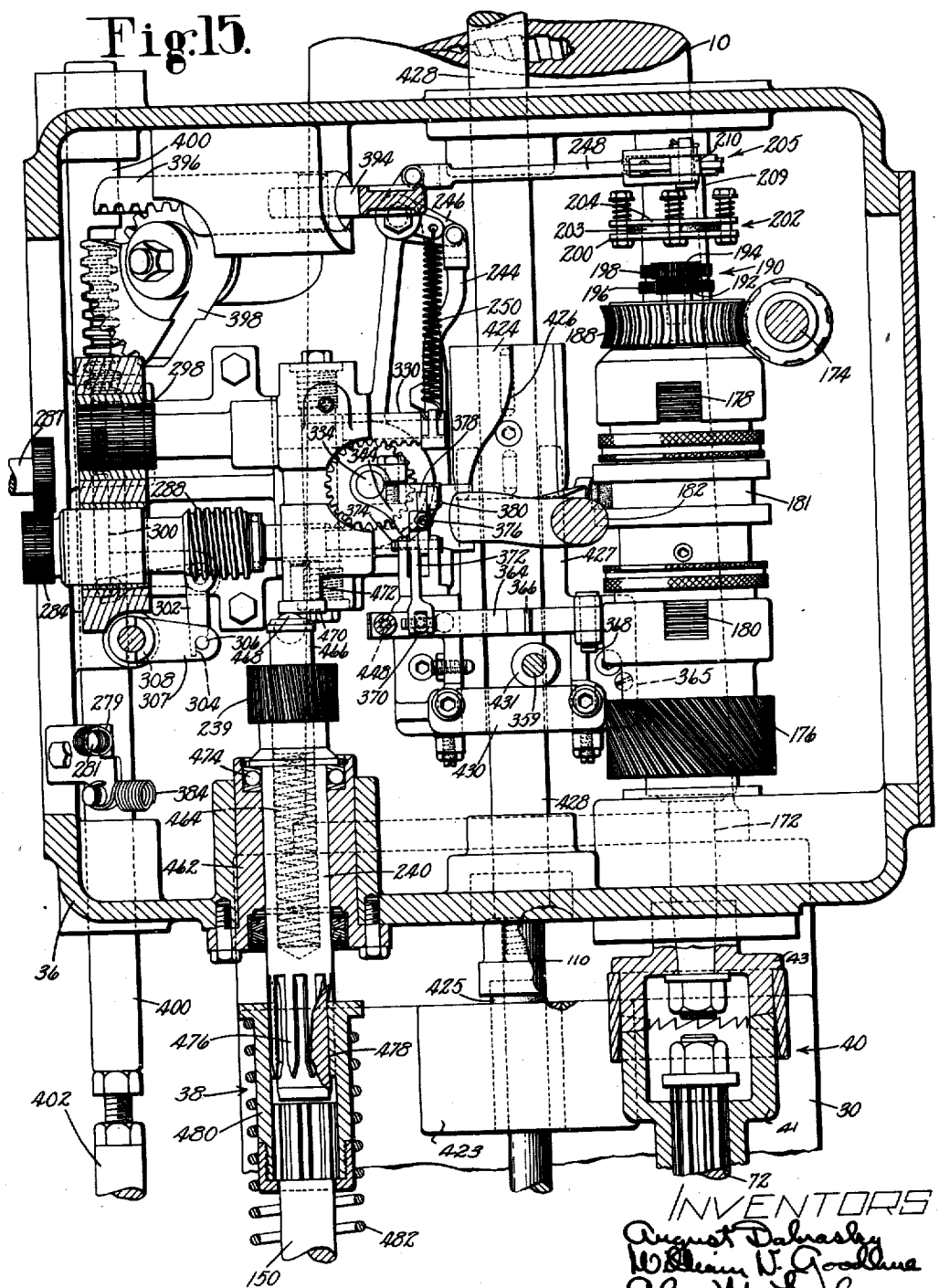

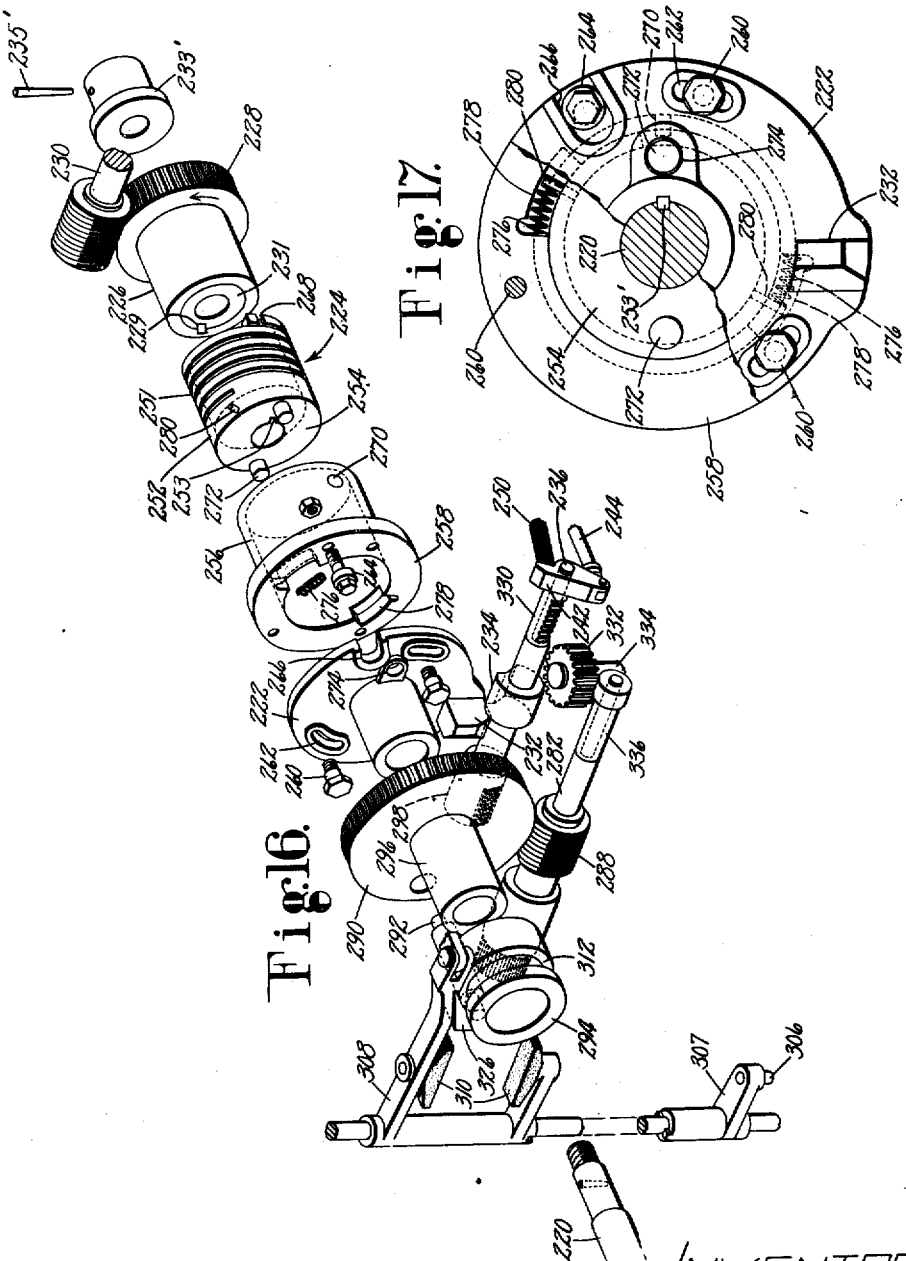

Patented June 1, 1948

2,442,401

UNITED STATES PATENT OFFICE 2,442,401

FUSE SETTER AND RAMMER

August Dabrasky, Washington, D. C., William V. Goodhue, Ipswich, Mass., and Galen M. Taylor, Cooper, Tex., assignors to United Shoe Machinery Corporation, Flemington, N. J., a corporation of New Jersey Application January 27, 1943, Serial No. 473,738

59 Claims. (Cl. 89—6)

This invention relates to fuse-setting and ramming mechanisms for breech-loading guns, and it is herein illustrated as embodied in a gun of the antiaircraft type and, while its field of use is general, it is particularly adapted for use with explosive shells having time fuses.

In feeding ammunition to artillery of a substantial size, arrangements have been provided which occupied a fixed position in space and in which it was necessary to bring the gun to a corresponding position before the round of ammunition could be rammed. This sort of an arrangement, however, considerably delays the firing of repeated rounds and is practically useless for antiaircraft guns where the elevation and azimuth vary so radically as the target is followed.

Furthermore, most shells are explosive and are provided with time fuses which must be set just before they are rammed. But in the use of time shells for artillery, and especially when following a rapidly moving target, it is essential that the gun shall be fired as soon after the fuse has been set as it efficiently can and, accordingly, it has been common to provide fuse-setting devices which were located on a support close to the breech of the gun. It was then necessary for the gunner to present the round of ammunition to the fuse-setting device, to withdraw it, and then to insert it in the breech of the gun. This in itself involved a certain delay interval called "dead time" during which time the fuse-setting usually became incorrect. Furthermore, for the reason that human beings are not all alike, there is a variable dead-time interval between the setting of the fuse and the firing of the gun which is not of a predictable length.

Consequently, an object of the invention is to devise a gun-serving mechanism in which the dead time will be very small and will be substantially constant. Another object of the invention is to devise a combined fuse-setting and ramming mechanism which may be mounted directly on the breech of the gun so that, no matter what the elevation or azimuth may be at the minute, only one progressive movement on the part of the gunner is necessary in presenting a shell, the fuse being set automatically.

In accordance with this object, a feature of the invention resides in fuse-setting and ramming devices which act successively upon a round of ammunition moving along an unbroken path alined at its terminus with the bore of the gun. Preferably, and as illustrated, these devices are secured to a breech ring of a breech-loading gun having a displaceable breech block.

When the guns are of substantial size, they are usually slidably mounted for recoil movement, thus involving a terrific acceleration which subjects any attached mechanical devices to severe stresses. To minimize such stresses, and in accordance with another feature of the invention, only the feed rolls and the fuse-setting mechanism are attached directly to the gun, while the source of power and a control mechanism, interconnected between it and the devices on the gun, are positioned upon the gun support, or cradle, so that they are not subject to recoil movement. As herein illustrated, the control mechanism determines the speed of operation of the ramming device and also controls the setting of the fuse, as well as the cycle of such operations. Accordingly, we have connected the control mechanism to the fuse-setting mechanism and to the ramming mechanism by means of separable clutches which, when the gun is in battery position, are in engagement and serve as a direct connection between the devices. When recoil comes, these clutches are separated, permitting the fuse-setting and ramming mechanisms to move with the gun and the control mechanism to stay unmoved upon the gun cradle.

In positioning these mechanisms upon the gun so that the ammunition passes successively from the feeding to the setting mechanism, or the reverse, it is essential that the fuse-setting mechanism should be constructed to permit passage of the round through it after the fuse has been set. Another feature of the invention resides in an improved fuse-setting device which surrounds the shell and has movable jaws capable of being moved either into engagement with the round or out of the path of the round. A firm grip of the fuse ring is effected, by providing the movable arms, or jaws, with sharp-edged disks. As herein illustrated, the jaws are swingably mounted upon a cage surrounding the path of movement of the ammunition, and the cage is provided with a sliding ring connected to the jaws to swing them in and out.

Determination of the time setting of the fuse by regulating the degrees of rotation of the fuse-setting mechanism and control of the general cycle of operations of the ramming and fuse-setting mechanisms is effected by a control mechanism supported as previously mentioned upon the gun cradle. In accordance with various novel features, this control mechanism provides for fractional rotation of a fuse-setting shaft and permits adjustment of the extent of that rotation as well as an automatic resetting of the mechanism for successive operations. The control of the cycle of operations is such that a shell is rammed into engagement with the fuse-setting mechanism by a frictionally-operated feed-roll mechanism, and the stalling of this mechanism is utilized to set the fuse-setting mechanism in operation. After the latter has been completed, the ramming mechanism again operates, and at a higher speed, to pass the shell directly into the gun along a path in line with the bore of the gun, thus simplifying the mechanism and reducing the dead time to an extremely short interval.

Another feature of the invention resides in the provision of means for moving the fuse-setting and ramming devices out of the path of the expelled cartridge case and in having these movements effected by the recoil movement of the gun.

In accordance with still another feature, a manually-operated device is provided for rendering the fuse-setting mechanism inoperative when it is desired to ram armor-piercing shells. In this case, the arrangement is such that the feed rolls operate at high speed, whenever they are driven, since the movement of the ammunition into the gun is one continuous movement and is not interrupted by the setting of the fuse.

These and other features of the invention will best be understood from a consideration of the following specification taken in connection with the accompanying drawing, in which Fig. 1 is a side elevation of the gun on its carriage, showing the relation thereto of the motor, the control devices and the fuse-setting and ramming mechanisms;

Fig. 5 is a vertical section on the line V—V of Fig. 3 with parts broken away and showing the fuse-setting mechanism;

Fig. 6 is a horizontal section through the feed rolls, showing the latter separated as when a cartridge case is being expelled after firing the gun;

Fig. 7 is a vertical section through the fuse-setting mechanism taken at right angles to Fig. 5 but showing the fuse-setting jaws withdrawn to permit the shell to be passed into the gun;

Fig. 8 is a schematic view of the mechanism contained within the control box and by means of which the sequence of events is determined;

Fig. 14 is a vertical section approximately on the line XIV—XIV of Fig. 9 and showing particularly the escapement mechanism;

Fig. 15 is a horizontal section taken on the line XV—XV of Fig. 14 and illustrating particularly parts of the fuse-setter-control mechanism;

Fig. 16 is an exploded angular view of the elements of the fuse-setter-control mechanism; and Fig. 17 is an end view, with parts broken away, of a wrap-around-spring clutch included therein.

Figure 1:
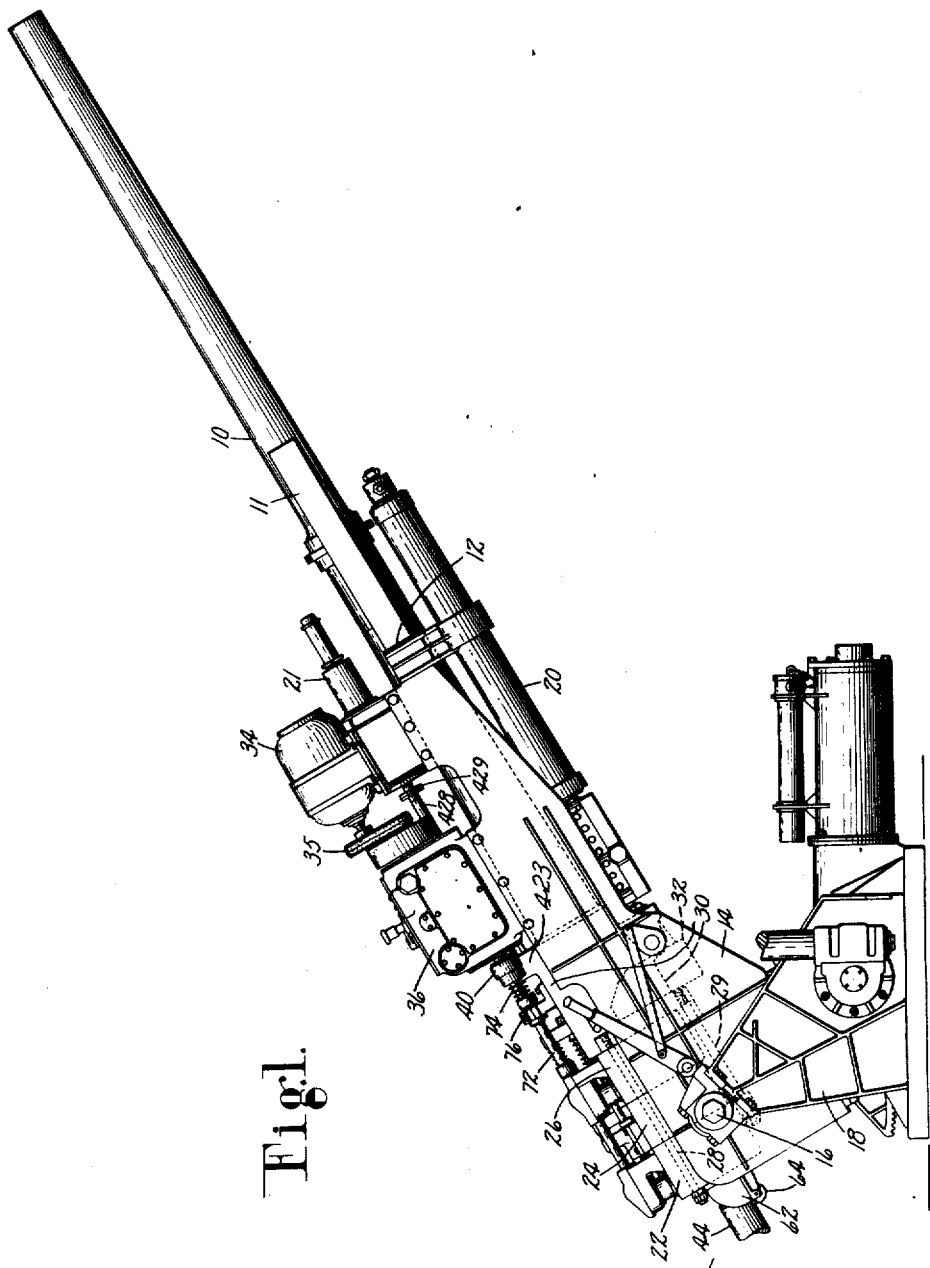
Figure 2:
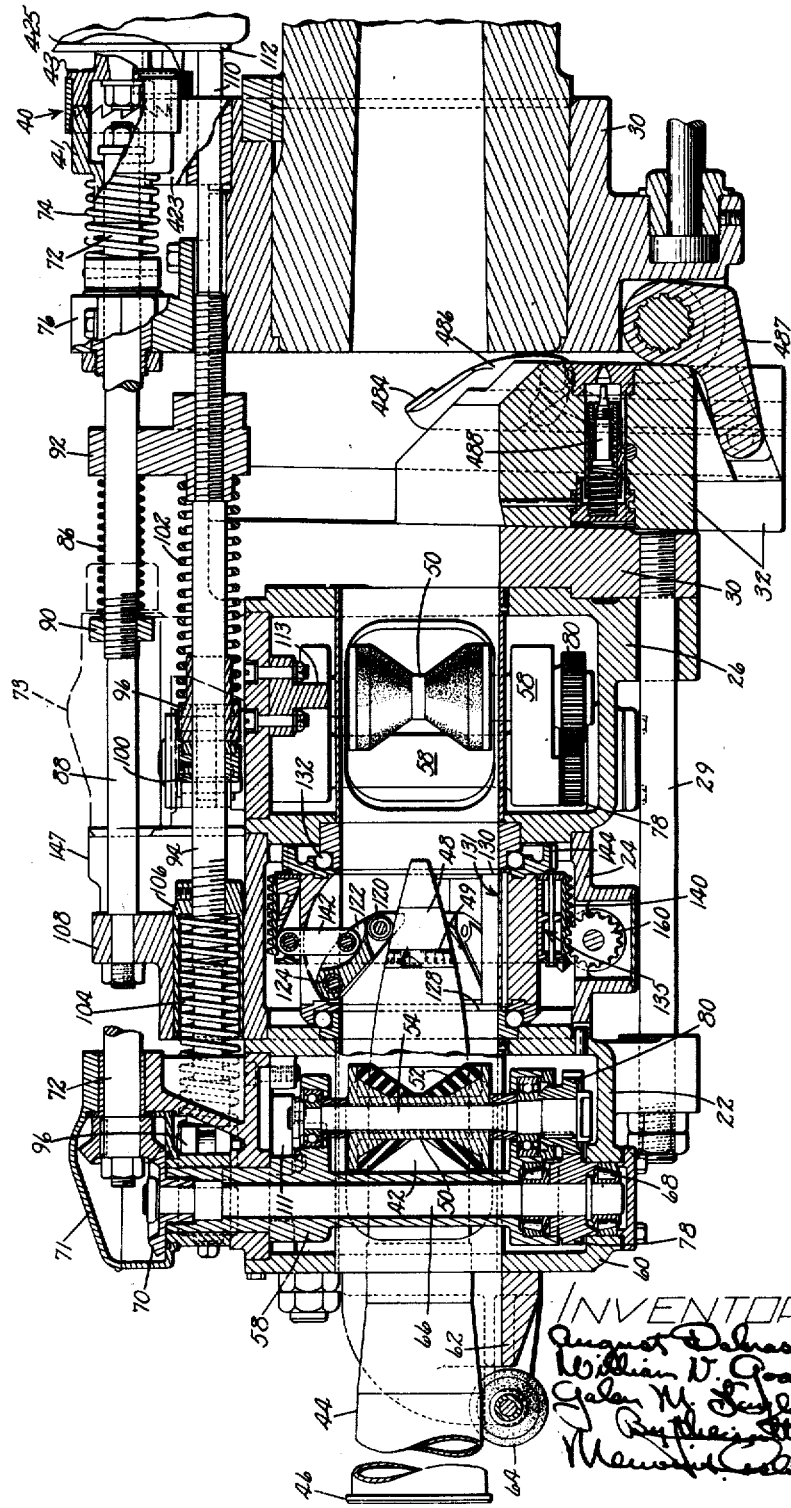
Fig. 2 is a vertical section through the breech end of the gun and the ramming and fuse-setting mechanisms taken along the line II—II of Fig. 3.

The invention has been herein illustrated as applied to an antiaircraft gun 10 (Fig. 1) slidably supported by rails 11 riding in guides 12 (Fig. 4) forming a part of a cradle 14 having trunnions 16 tiltable in a suitable support 18. Recoil cylinders 20 and a counter-recoil cylinder 21 are secured to the cradle. The ramming and fuse-setting mechanism comprises sectional castings 22, 24 and 26 which are supported by means of bolts 28, 29 upon the breech ring 30, and this latter is provided with guides for a vertically slidable breechblock 32 (Fig. 2). Power is supplied to these mechanisms from an electric motor 34, through a control box 36, both supported upon the crade, and is transmitted to the fuse-setting mechanism through a coupler 38 (Figs. 3 and 15) and to the ramming mechanism through a separable dog clutch 40. When the gun recoils, the fuse-setting and ramming mechanisms move with it, while the motor and the control box remain fixed upon the cradle 14. The arrangement is such that the ammunition is moved along a path, terminating in the gun barrel, and which is not broken and thus does not include any abrupt change in direction.

RAMMING MECHANISM

The ammunition is delivered to such a gun in the form of an assembled round (Fig. 2) comprising a shell 42 and an associated cartridge case 44 which has the usual flange 46. The shell may be of the armor-piercing type, when the fuse will be embodied in a base plug (not shown), or it may be provided with a time fuse having a rotatable setting ring 48 associated with graduations 49. The setting of the fuse is effected, as later described, while the round is positioned in alinement with the gun barrel, as the ammunition is being presented to the gun and, immediately thereafter, the round is passed into the gun barrel, whereupon the breechblock is closed and the gun fired. With this arrangement, the dead time is nearly all eliminated and what there is of it becomes a substantially fixed quantity. There is necessarily a difference of a fraction of a second between a short fuse-setting requiring, for example, only a ten degree turn and a longer setting which requires a turn of three hundred and fifty degrees but this is not ordinarily considered to be part of the dead time and may be offset by other uncontrollable variables.

Figure 3:
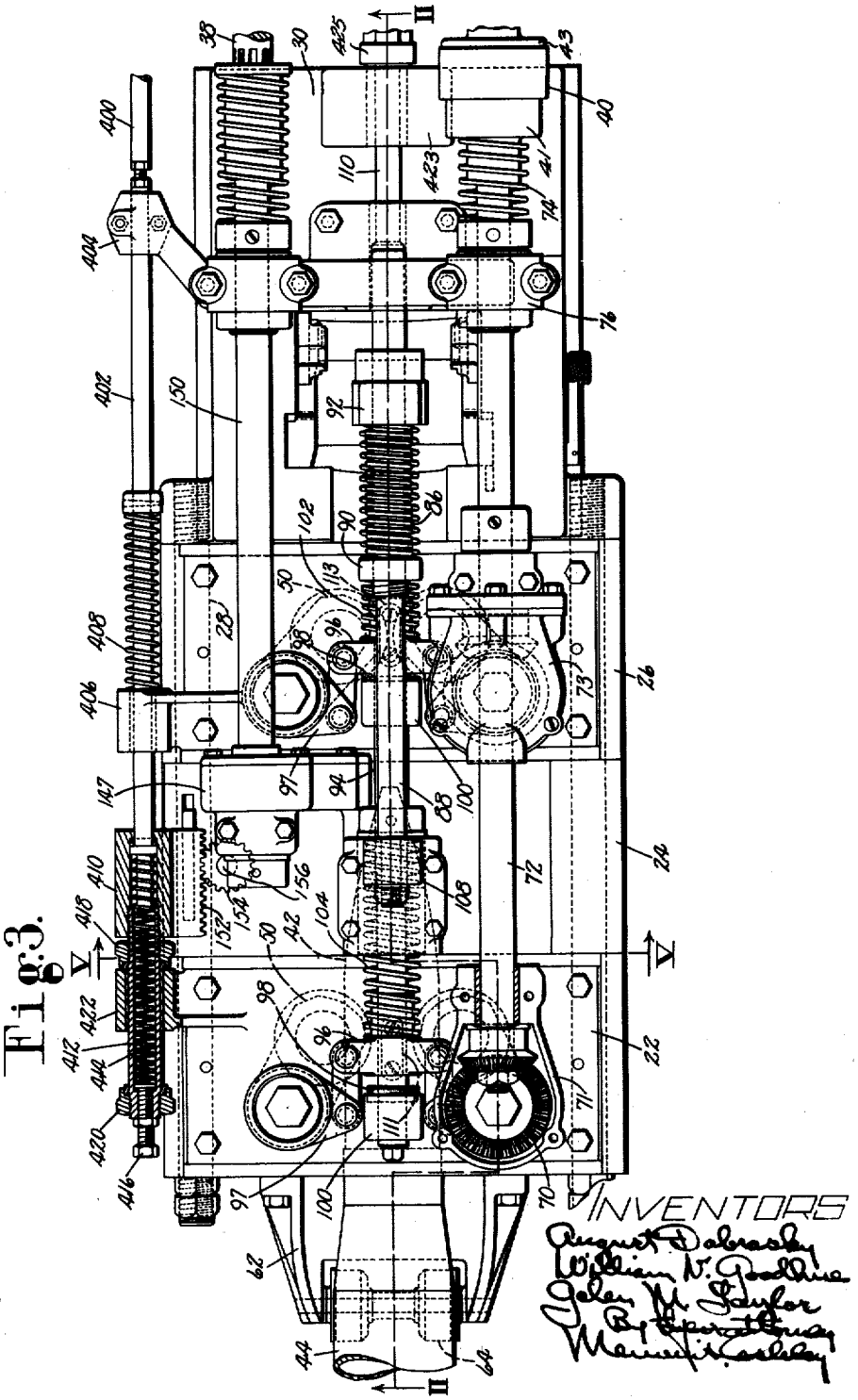
Fig. 3 is a plan view partly in section of these latter mechanisms.
Figure 4:
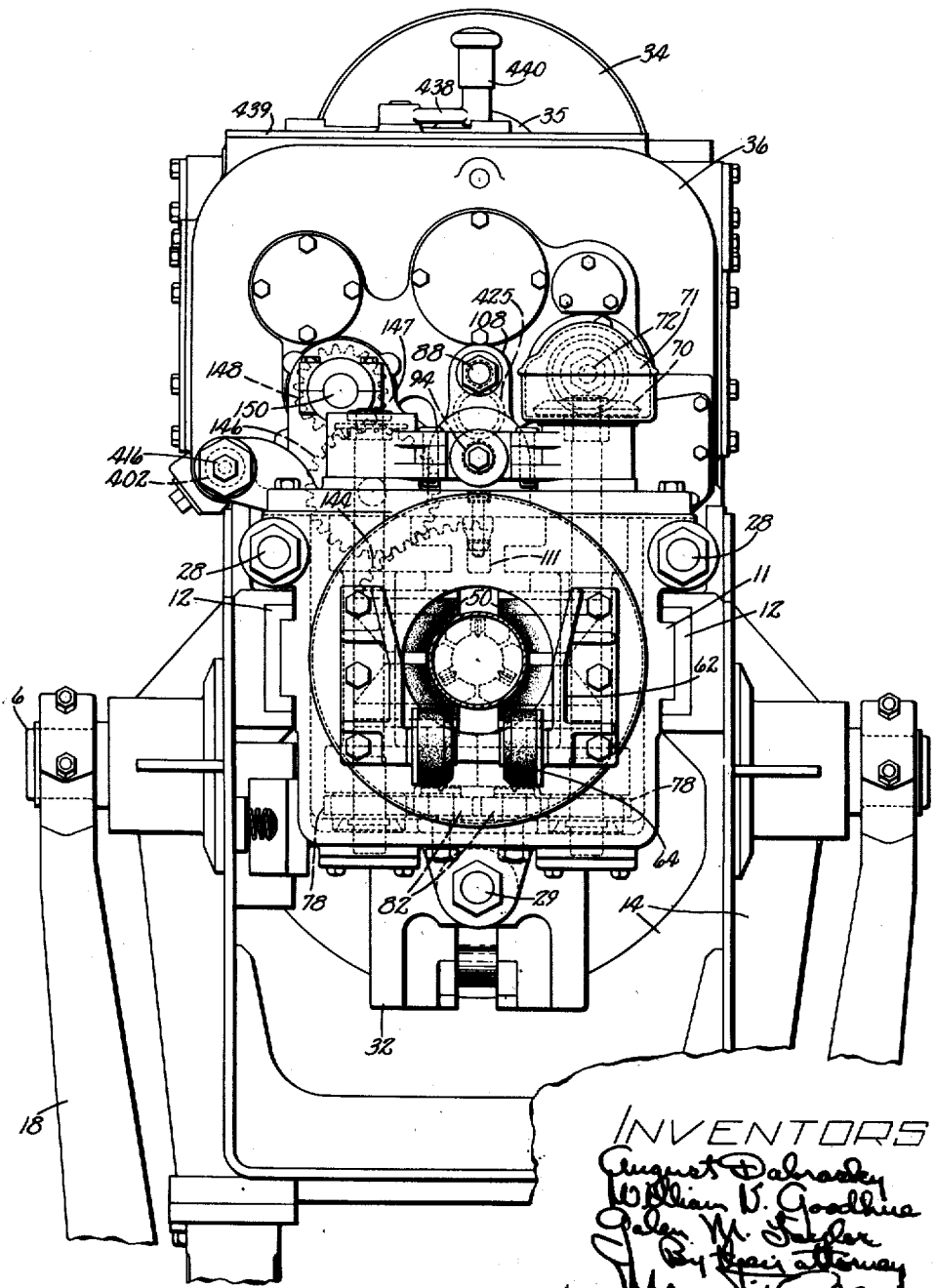
Fig. 4 is a rear elevation of the gun carriage, looking into the ramming mechanism and showing the back end of a control box.

The ramming mechanism herein illustrated is provided with two pairs of feed rolls 50 each of which comprises opposed frusto-conical surfaces 52 of resilient material. Each feed roll is provided with a shaft 54 (Fig. 2) mounted in suitable bearings in the arms of a swinging carrier 58. The cooperating rolls 50 of a pair (Figs. 3 and 4) are swung into engagement with the periphery of the round and are yieldable, in a manner to be described, so that they may cooperate with the varying diameters of the round as it moves into the gun. A cover plate 60 secured to the sectional casting 22 provides a support for a bracket 62 in which are carried idle rolls 64 which assist in centering the round as it is presented to the ramming mechanism. Each feed roll carrier 58, as shown in Fig. 2, swings on a jack shaft 66. Each shaft 66 is supported upon a bearing 68, and those at the right side of the rammer have at their upper ends bevel gears 70 within housings 71 and 73 meshing with similar gears on a drive shaft 72 at the forward end of which is one half 44 of the clutch 40; this half being splined to the shaft and capable of yielding against a spring 74 (Fig. 2). The shaft 72 is carried in bearings provided by the sections 22 and 26 and by a lug 76 on the breech ring 30. Each jack shaft 66 has at its lower end a pinion 78 meshing with a pinion 80 on the roll shaft, thereby to drive the roll. The pinions 78 on opposite sides of the rammer are interconnected by gears 82 (Figs. 4 and 6). By this arrangement, the supply of power to the cooperating rolls of a set is independent of the positions of the carriers, and it will later be shown that, after firing the gun, these carriers are swung aside to provide a free passage for the expulsion of the cartridge case 44, as indicated in Fig. 6. Inasmuch as the feed roll elements contained within the forward section 26 are identical with those already described, no further description will be given of these parts, and the same numerals will be applied thereto.

Separation of the feed roll carriers is effected by a spring 86 (Fig. 2) surrounding a rod 88 and bearing at one end against a collar 90 secured to the rod and at its forward end against a block 92. This block is slidable on the rod 88 and has its lower end threaded to a rod 94 which is yieldably connected to the feed roll carriers. This yieldable connection is effected by coil springs 102 and 104, abutting yokes 96 which are joined by links to arms 97 on the carriers, and are slidable upon the rod 94 against bumpers 98 provided in collars 100 which are secured to the rod 94. The spring 102 abuts the block 92 at one end and a yoke 96 at the other end, while the spring 104 is interposed between a sleeve-like collar 106, which is secured to the rod 94, and the rear yoke 96. This sleeve-like collar 106 is slidable within a projection 108 bolted to the upper side of the section casting 24, which projection 108 serves furthermore as an anchor for the rod 88. The reduced forward end 110 of the rod 94 is positioned for engagement with an abutment 112 formed on the control box 36. Accordingly, when the gun is in battery position, as shown in Fig. 2, this rod 94 is pushed back against the spring 86 thereby to hold the feed rolls 50 (Fig. 3) resiliently through springs 102 and 104, against the sides of the round of ammunition and accommodating variations in diameter from point to base. Inward movement of the carriers 58 when no round is between the rolls is limited by suitable stops 111 and 113 (Figs. 2, 3 and 4). Upon recoil, the already compressed spring 86 expands and, acting through the block 92, moves the rod 94 forward to swing the feed roll carriers out to the position shown in Fig. 6 where there is sufficient space to permit a free passage of the expelled cartridge case 44.

FUSE-SETTING MECHANISM

The parts of the fuse-setting mechanism which grasp the fuse-setting ring 48 of the shell are contained within the section casting 24. Firm engagement of the mechanism with the ring 48 is effected by sharp-edged disks 120 (Figs. 2, 5 and 7) mounted in a trio of jaws 122 which are pivotally carried on pins 124 extending between arcuate portions 126 which, with the side plates 128 and 130, go to make up a rotatable cage 131 mounted on ball bearings 132 for rotation around the axis of the gun. The side plates are frictionally held in clamping engagement with the sections 126 by means of transverse bolts 134. The outer surface of the cage is cylindrical and supports a sliding ring 135 made up of a ring 136 reinforced by flat annuli 138 held thereon by bolts 139 (Fig. 7). An annular sleeve 140 surrounds and tightly frictionally engages the ring 135, being gripped by the annuli 138, and having, on its outer surface, parallel peripheral grooves which constitute a rack enabling the ring to be moved along the axis of the gun from one end to the other of the cage 131 in a manner to be described. Extending between the ring 135 and the jaws 122 are links 142 which, when the ring 135 is forward, as in Fig. 2, extend substantially radially and hold the disks 120 in firm engagement with the fuse ring 48. When, on the other hand, the ring 135 is slid to the position shown in Fig. 7, these arms 142 are drawn into recesses provided in the cage so that they are completely out of the path of the cartridge case 44 as it moves into the gun or when it is expelled after firing.

Fractional rotation of the cage 131 around the axis of the gun to set the fuse ring 48 is effected by power delivered to an annular gear 144 formed on the side plate 130. This gear meshes with a pinion 146 (Fig. 5) within a casing 147 integral, for convenience, with the projection 108. The pinion 146 in turn is driven by a pinion 148 upon an operating shaft 150 for the fuse setter. This shaft 150 carries part of the coupler 38 (Fig. 15) and receives power through the control box 36 at appropriate times. For sliding the ring 135 upon the cage to move the arms 122 in and out, power is received from a sliding rack 152 (Fig. 3) meshing with a pinion 154 on the upper end of a shaft 156 (Fig. 5). This shaft 156 is provided with a pinion 158 meshing with the ring-like rack 140, and the shaft serves also to drive other shafts which are provided with pinions 160 and 162 so that there is no tendency to cramp the ring upon the cage.

MOTOR DRIVE

Power is supplied from the motor 34 (Fig. 1) which is connected by belts 35 to the forward end of a drive shaft 170 (Figs. 8 and 9) contained within the control box 36, (a) to rotate the feed rolls, thereby to carry the shell into engagement with the fuse-setter jaws, (b) to turn the fuse setter, thereby to set the fuse in accordance with data received from a director, (c) to then move the jaws out of the way, and (d) to drive the feed rolls at a higher speed, thereby to carry the shell into the gun. The breech is then closed automatically and the gun fired as desired, either automatically (not shown) or manually (not shown). Closure of the breechblock is effected automatically when the flange 46 upon the round of ammunition engages the arms 484 (Fig. 2) of an extractor 486 which is pivoted in the breechblock 32. The consequent rocking of this extractor clockwise moves its trunnions from the locking position shown to a release position in the grooves shown in dotted lines so that a spring (not shown) acting through an arm 487 will raise the breechblock into position to close the rear end of the barrel of the gun ready for firing. Any suitable arrangement may be employed for opening the breechblock 32 after the gun has been fired. One such arrangement acts through the arm 487 to lower the block during counterrecoil.

CONTROL MECHANISM

Figure 10:
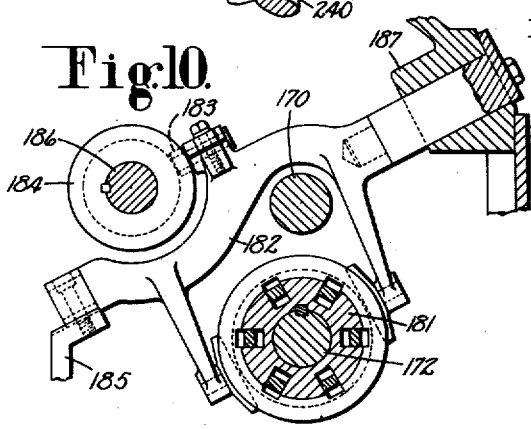
Fig. 10 is a vertical section on the line X—X of Fig. 9 to show a clutch shipper.
Figure 13:
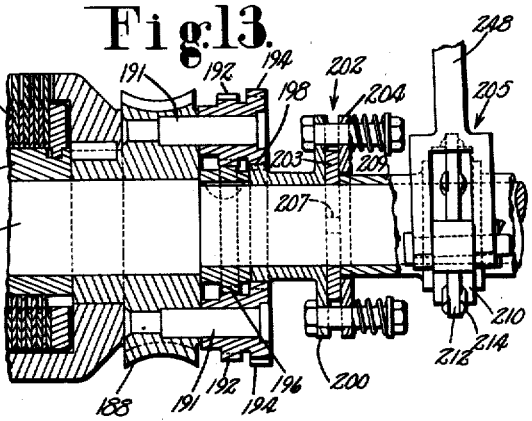
Fig. 13 is a vertical section, also enlarged, through a differential mechanism mounted on the shaft with this clutch.

To determine the setting of the fuse and to control the sequence of operations, a control mechanism, shown diagrammatically in Fig. 8, is provided within the control box 36. In this control mechanism, the power of the drive shaft 170 is transmitted to a subjacent clutch shaft 172 through either a low-speed connection including a countershaft 174 (Figs. 8 and 14), or through a high-speed connection embodying gears 176, depending upon which one of two clutches 178 or 180 is closed by the action of a sleeve 181 splined to the shaft 172 and moved by a speed shipper 182 (Fig. 10). This shipper has a cam roll 183 engaging the track of a cam 184 on a cam shaft 186, and it is pivoted between a bracket 185 and a boss 187. The clutch shaft 172 is provided at its rear end with one part 43 of the dog clutch 40 by means of which power is supplied to drive the feed rolls. Also supported on the shaft 172 is a worm gear 188 meshing with a worm on the countershaft 174 and comprising a part of the low-speed drive as well as a part of a differential 190, shown in Figs. 13 and 15.

*Differential*

Figure 12:
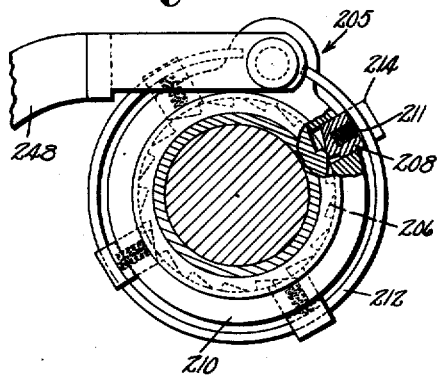
Fig. 12 is an enlarged detailed view of an overriding clutch.

This differential, by reversing when the feed rolls stall because the shell they are ramming has been stopped in its forward travel by coming against the fuse-setter jaws, "pulls the trigger" to start the fuse-setting operation. The differential itself comprises a pair of studs 191 supported on the worm gear 188 (Fig. 13) and each carrying a rotor provided with pinions 192 and 194. These rotors are free to revolve upon the studs 191. Meshing with the inner pinions 192, is a gear 196 which is keyed on the shaft 172 and, meshing with the pinions 194, is a gear 198 freely rotatable on the shaft and common with one half 200 of a friction clutch 202 having an annular plate 204 spring pressed against a mid plate 203 which is joined by notch and tongue 207 to a sleeve 209 terminating in a ratchet-like rotor 206 which is part of an overriding clutch 205, shown in Fig. 12. The latter clutch is made up of pawls 208 slidable in a ring 210 and held in engagement with the teeth of the rotor 206 by internal springs 211 resting against a band 212 which is received in the slotted ends 214 of the pawls.

*Fuse-setter shaft*

On the other side of the control box from the clutch shaft is a fuse-setter shaft 220. Mounted on this shaft for limited angular movement with respect thereto is a controller 222 (Figs. 8, 9 and 16) connected by a wrap-around-spring clutch 224 with a sleeve 226 splined at 229 to the hub 231 of a worm gear 228 which is constantly rotated by means of a countershaft 230 connecting it through spiral gears 233, 235 (Fig. 14), to the drive shaft 170. Axial movement of the gear 228 along the shaft 220 is prevented by a collar 233' held on the shaft by a pin 235' (Fig. 16). The controller 222 is also known as a release plate and, on it, is a shoulder 232 held by the clutch 224 in engagement with the side face of a block constituting a zero stop 234 which is integral with a transverse stop-shaft 236. When the zero stop 234 is turned out of the way of the shoulder 232, the controller 222 is rotated through a portion of a revolution, carrying with it the fuse-setter shaft 220 and driving, through the gears 238, 239 (Fig. 8), a fuse-setter coupling shaft 240 which carries a portion of the coupler 38. The stop 234 is moved out of the way of the shoulder 232 by turning the transverse shaft 236, and this is done through a crank 242 on this shaft joined by a link 244 to a bell crank 246 which in turn is joined by a link 248 to the ring portion 210 of the overriding clutch.

Thus, when the feed rolls stall, by reason of the engagement of the shell with the fuse-setter jaws, the differential will cause the ring 210 to be turned counterclockwise, as seen in Fig. 8, the zero stop 234 to be withdrawn, and the fuse to be set. As soon as the fuse has been set, the fuse-setter jaws 122 are withdrawn, as will be later described, and the shell is permitted to pass on into the gun. Thus, the stalling action of the rolls on the differential 190 is relieved, and the zero stop 234 is drawn back into the path of the shoulder 232 by a tension spring 250 extending between the crank 242 and the bell crank 246, the latter serving also as a suitable fastening place for one end of the spring.

*Wrap-around-spring clutch*

Figure 9:
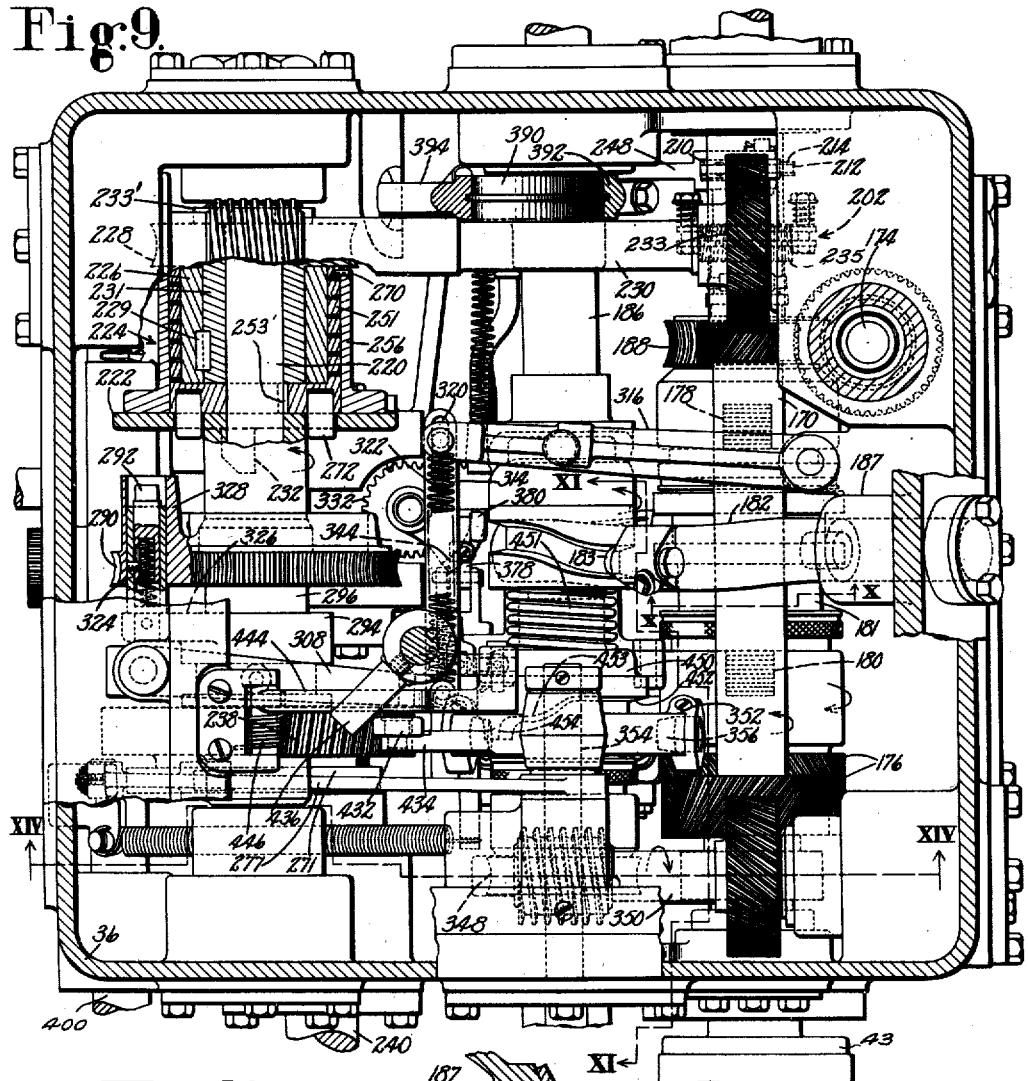
Fig. 9 is a plan view of the control-box mechanism with the cover removed.

The construction of the wrap-around-spring clutch 224 is shown in Figs. 9, 16 and 17 where it will be seen that the spring 251 is cut in a cylinder 252 having a closed end 254 which is held to the shaft 220 by a key 253' (Fig. 17) in a keyway 253. The spring portion of this member closely surrounds the hub sleeve 226 and is contained within a flanged casing 256, to the flange 258 of which the controller 222 is clamped by screws 260. These screws pass through slots 262 permitting adjustment of the position of the controller with respect to the flange by means of an eccentric stud 264 engaging a radial slot 266 in the controller and held by a nut on the opposite side of the flange. The free end of the spring 251 is notched at 268 to receive a pin 270 (Fig. 9) projecting inwardly of the casing 256. On the closed end 254 of the spring cylinder 252 are studs 272 slightly smaller than and received in openings 274 in the controller 222. In assembling these parts, the eccentric 264 is turned until the studs 272, integral with the closed end of the spring, are brought to a position substantially central of the openings 274 in the controller 222 during driving conditions and are moved in a counterclockwise direction (Fig. 17) against one side of these openings 274 when the clutch is released. Booster springs 276 received in notches 278 formed in the casing 256 bear against pins 280 extending radially from the clutch spring sleeve 252. It will be understood that there is a slight constant friction between driven hub sleeve 226 and the spring 251 acting in a direction which would, if it could, rotate the fuse-setting shaft 220 in a counterclockwise direction, as viewed in Figs. 8 and 16, thus holding the shoulder 232 in engagement with the zero stop 234. It is essential, however, in view of the amount of power which is transmitted by this clutch, that the friction between the spring 251 and the sleeve 226 shall not be excessive between successive fuse-setting operations. Accordingly, there has been provided upon the gear 238 (Fig. 8) at the near end of the fuse-setter shaft a cam 271 (Fig. 14) whose periphery is a spiral having its ends joined by a surface 273 which is inclined slightly with respect to a radius of the gear. Resting against the cam is an antifriction roll 275 which is carried by a depending portion of a lever 277 urged downwardly by a spring 279 joined at its lower end to a pin 281 (Fig. 15) on a bracket attached to the control box. The lever 277 is carried by a pin 354 (Fig. 14). This cam 271 is so positioned with respect to the fuse setter shaft that the roller 275 comes to the brink of the upright surface 273 just as the shoulder 232 of the controller contacts the zero stop 234. The spring 279 is then effective to cause the roller 275, dropping down the surface 273, to push the cam and, hence, the fuse setter shaft a very small distance counterclockwise, as viewed in Fig. 14. As a consequence, since the position of the controller 222 cannot change, the spring 251 is unwrapped slightly from the hub sleeve 226 and the friction is lessened. As soon as the zero stop is moved out of the way by the overriding clutch 205, the spring 251 grips the hub sleeve 226 because of the action of the booster springs 276 and the shaft is given a partial revolution from the continuously driven countershaft 230 thereby to set the fuse. The extent of this rotation is determined by the setting of a data shaft 282 which has a gear 284 meshing with a pinion provided with a shaft 287 having a handle 285 by means of which it may be turned to a position indicated by a dial 286 in accordance with the desired number of seconds delay in the bursting of the fuse as determined by information received from the director.

Set and reset mechanism

The end of the fuse-setting rotation of the shaft 220 is determined by engagement of the shoulder 232 on the controller with a stop known as a data pin 292 which, as later described, is slidable in directions parallel to the shaft 220. The data shaft 282 forms part of a so-called "set-and-reset" mechanism and is provided with a worm 288 meshing with a worm gear 290 free for rotational adjustment on the fuse-setter shaft 220. As will be seen from Fig. 16, this gear 290 is perforated to receive the data pin 292 supported on an arm 326 carried by a grooved collar 294 which is mounted so that it may slide on the hub 296 of the worm gear 290. When the collar slides, the pin slides with it in the hole in the gear 290. The previously described turning of the stop shaft 236 (Fig. 8) to start the fuse-setting operation, acts through a gear 298, a rack 300, and a latch 302 to draw a notch 304 (see also Fig. 15) in the latch away from a pin 306 on a lower arm 307 of a shipper 308. This shipper has a yoke provided with shoes 310 (Fig. 16) for engagement in the groove 312 of the sliding sleeve 294. The uppermost arm of the shipper yoke is joined by a link 314 to a swinging arm 316 the movements of which are controlled by a cam 318 on the cam shaft 186. The connection between this link 314 and the swinging arm 316 includes a slot 320 (Figs. 8 and 9) and a spring 322 so that the data pin 292 will be immediately moved into the path of the controller shoulder 232 as soon as the notch 304 of the lacth is drawn away from the pin 306 of the shipper, this movement being effected by the spring 322. The position of the data pin determines, therefore, the degrees of fractional rotation of the controller 222 and hence of the fuse-setting shaft 220 and, as soon as the shoulder 232 engages the data pin 292, this controller 222 acts as a clutch-release plate, serving to unwrap the spring 251 from the hub 226.

It will be observed from Fig. 9 that the data pin 292 is yieldably supported within a sleeve 324 pinned to the arm 326 which forms part of the collar 294 which is operated by the shipper 308. The sleeve 324 moves within a sheath 328 which is integral with the worm gear 290 the position of which is determined by turning the worm 288. Since this collar 294 carrying the arm 326 which supports the data pin 292 is loose upon the hub 296 of the worm gear, the shipper may be operated in any position of the data pin.

On the stop shaft 236 is a sleeve 330 having rack teeth (Fig. 16) which mesh with a pinion 332 carried on a vertical shaft 334. Engaging the other side of this pinion 332 is another rack 336 formed upon a sleeve which is loose on the data shaft 282, thus providing a whiffletree connection between said shafts.

When, in the operation of turning the fuse-setter shaft 220, the shoulder 232 moving counterclockwise strikes the data pin 292, the reaction through the worm gear 290 tends to displace the worm 288 in a direction axially of its shaft 282. This slight movement is transmitted through the pinion 332 to the vertical shaft 334 which is provided at its top with a cam 344. This cam operates through an escapement mechanism, to be described, to cause a half revolution of the cam shaft 186 as the latter is driven by a plate friction clutch 346 (Fig. 8) interposed between the cam shaft and a gear 348 free on the cam shaft and connected to the drive shaft 170 by means of an intermediate shaft 350. To soften the movements of the fuse-setting control mechanism, the lower end of the vertical cam shaft 334 is provided with a gear 338 (Fig. 8) which meshes with a rack formed upon a double-ended piston 340 the ends of which slide in a casing 342 which, in the actual construction, is formed in the casting shown at the bottom of Fig. 14 and which supports the bracket 185 of Fig. 10. This piston 340 and the casing 342 serve as a double-acting dashpot and to this end the cylinders of casing 342 (Fig. 8) are interconnected by a passage 343 having an orifice control screw 345.

Escapement mechanism

Controlling the cam shaft to produce successive half rotations thereof is an escapement mechanism comprising a ring-like pendulum 352 (Figs. 8, 9, 11 and 14) swinging upon a pivot pin 354 carried by the box 36 (Fig. 11) and having tapered cam rolls 356 and 358 (Fig. 14). This escapement pendulum has at its lower end a spindle 359 carrying an antifriction roll 360 which is used when it is desired to reset the pendulum, and, offset therefrom (Figs. 11 and 14), a lug 362 adapted for engagement with a horizontally positioned latch 364 pivoted on a casting 365 which is attached to the box 36. The latch has an upward projection 366 for engagement with the lug 362 and is pivoted on a pin 368 (Figs. 14 and 15). Depression of this latch to permit the escapement to start the rotation of the cam shaft 186 is effected by a depending trigger pin 370 (Figs. 8 and 15) which is hinged on the end of a lever 372 parallel to the drive shaft. The lever 372 is pivoted in turn on fixed pin 374 and has an overhanging end with an adjustable screw 376. This screw rests against the upper side of a lever 378 which is also pivoted on the pin 374 and is provided with a roll 380 resting on the upper surface of the cam 344 which is moved by the set-and-reset mechanism. A spring 382 (Fig. 14) supports the latch 364 in position to engage the escapement pendulum and hold it in the position shown in Fig. 14. The pendulum is held against the lug 366 on the latch by means of a tensioned coiled spring 384 tending always to turn the pendulum in a clockwise direction so that the roll 360 would move to the left in that figure.

These half rotations of the cam shaft, started by swings of the pendulum, do a number of things. One of them follows the fuse-setting operation and is effective, through the cam 318, to recock the shipper 308, thereby to pull the data pin 292 out of the path of the shoulder 232 and to allow the fuse-setter controller to return to starting position. In so doing the controller shoulder 232 will, by impact with zero stop 234, axially displace the stop shaft 236 to bring it back to its original position and, by reason of the coaction of the racks 330 and 336 with the intermediate gear 332, it will move the worm 288 and hence carry the data pin 292 to its preset starting position. It also operates the shipper 182 to drive the feed rolls at high speed, 1100 R. P. M., for example, instead of 200 R. P. M. at low speed, and furthermore it turns an eccentric 390 which is surrounded by a strap 392 (Figs. 8 and 9) attached to a connecting rod 394 which is pivotally connected (Fig. 15) to a rack 396. The motion of the rack is transmitted, around a corner of the control box, by means of a double segment 398, to draw back into the box a rod 400 which lies at the lower left-hand corner of the control box, as shown in Fig. 14, and thus permits withdrawal of the fuse-setting jaws 122 to the position shown in Fig. 7.

Later, during recoil of the gun, the escapement pendulum is returned to the low-speed position and latched, this movement having been caused by the action of a cam block 424 carried by a counter-recoil buffer rod 428 as it is moved rearwardly by a spring in the recoil buffer unit 21. This recocking of the escapement pendulum will cause a second half revolution of the cam shaft, causing the speed shipper 182 to shift back to its low-speed position. At the same time, the cam lever 316 swings forwardly so that the shipper 308 will be free to move the data pin 292 into the path of the shoulder 232 when tripped by the differential in the following cycle. It will also cause the rod 400 to again project from the control box in order to close the fuse jaws as the gun returns to battery position.

*Fuse-setter-jaw movements*

The rod 400 is in alinement with a rod 402 (Fig. 3) connected to the fuse-setter jaws and slidably mounted in brackets 404 and 406. Bracket 404 is on the breech ring and the other one is on the section 26 containing one set of feed rolls. This rod 402 is normally pushed forwardly of the gun by means of a surrounding jaw-release spring 408 and, when so pushed forward, it will carry with it the rack 152 (see also Fig. 5) which slides the rack-like sleeve 140 (Fig. 7) surrounding the fuse-setting cage and causes the fuse-setting jaws to be withdrawn. The rear end of the rod 402, at the left in Fig. 3, is positioned within a case 410, forming part of the rack 152, and in which there is threaded a hollow cylinder 412. The cylinder 412 contains a spring 414 the compression of which, adjusted by a screw 416, is such that normally it does not yield. If the fuse-setting jaws are accidentally obstructed by some foreign body as the gun returns to battery, this spring 414 will yield and avoid breakage of the parts associated with the opening and closing of the fuse-setting jaws. Threaded on this cylinder 412 are bumpers 418 and 420 provided with brass rings adapted to engage the opposite ends of a guide bracket 422 which is integral with the rear section 22. Thus in one position of the ecentric 390 (Fig. 8) the rod 400 will be effective to push the rod 402 into the position shown in Fig. 3 where the fuse-setting jaws are in their inner position ready to catch a shell as it is fed to them. In its other position, the eccentric 390 draws back the rod 402 into the control box, whereupon the spring 408 (Fig. 3) withdraws the fuse-setting jaws so that the shell may be pushed forward into the gun, and this takes place at approximately the same time as the speed of the feed-roll drive is increased.

Figure 11:
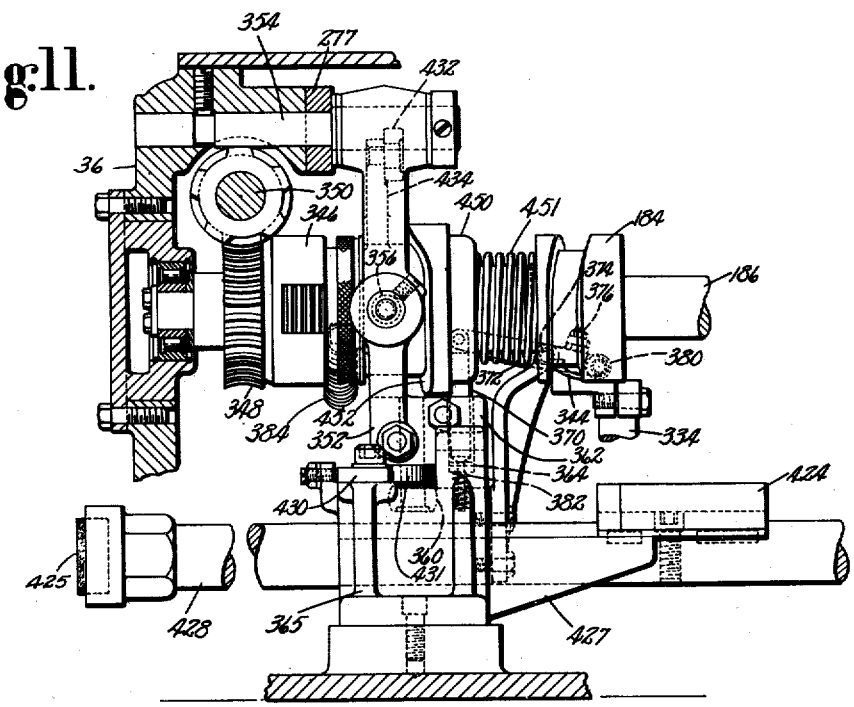
Fig. 11 is a side elevation, with parts in section, of an escapement mechanism which is taken approximately at the plane XI—XI in Fig. 9.

After these operations during which the escapement pendulum 352 has remained at the left, there comes a time, as mentioned above, when it is desired to swing it back to its original position where it will be again caught by the latch 364. This is effected by means of the block cam 424 having a vertical cam surface 426 (Figs. 14 and 15). This cam is secured to a rod 428, which is an extension of the piston rod of the counter-recoil buffer 21, shown in Fig. 1, and passes through the control box 36. This rod has, at its rear end, a buffer pad 425 resting against a lug 423 projecting up from the breech ring 30 (Figs. 3 and 15) and, at its front end, a coupling 429 (Fig. 1) for coaction with a coupling on said piston-rod portion of the counter-recoil mechanism 21. To support the cam 424 against turning, it rides on guide arms 427 attached to a casting 365 (Fig. 11). During recoil, the breech ring moves away from the pad 425 and thereupon a spring (not shown) in the counter-recoil buffer 21 moves the rod rearward, whereupon the cam 424 becomes effective to reset the escapement. As the pressure of the cam 424 against the roll 360, as well as that of an escapement cam 450, to be described, may be considerable, a thrust plate 430 is provided (Fig. 15) the edge of which forms a surface bearing for a thrust roll 431 also carried by the depending spindle 359 which supports the roll 360, thereby to prevent the escapement pendulum from being cramped upon its pivot 354.

*Control reset for armor-piercing shells*

The escapement pendulum is also provided with a resetting roll 432 upon the upper end of an arm 434 (Fig. 14) integral with the pendulum, and this roll is in the path of movement of a stub pin 436 projecting from the inner end of a hand crank 438 carried by a cover 439 of the control box and having a latched handle 440. When it is desired to utilize the mechanism for armor-piercing shells, so that no fuse-setting operation is involved, the handle 440 is turned from the position shown in Figs. 9 and 14 to a position in which the stub pin 436 passes over the roller 432 without results, and then rides up upon the cam surface 442 of a lever 444 pivoted on the control box and normaly held up by a spring 446. The lever 444 has a depending, bent trigger-pin 448, the lower end of which is reduced and passes through a hole in the latch 364. As the latch is thus tripped, the spring 384 becomes effective to hold the escapement pendulum to the left, instead of holding it in the latched position shown in Fig. 14. When it is desired to return to fuse setting, the handle is returned to the position shown in that figure and the stub pin 436 allows the pin 448 to be raised by the spring 446, rendering the latch 364 effective as it is lifted by spring 382, and at the same time it rides back over the roll 432 and pushes the escapement pendulum into the position of Fig. 14 where it is caught and held by the latch.

*Escapement cam*

This escapement is made effective to control the rotation of the cam shaft 186 by its cooperation with a cam 450 (Fig. 11) splined to slide on the cam shaft and controlling the so-called "friction clutch" 346 of Fig. 8 which is a plate clutch interposed between the gear 348 and the cam 450. The latter has a substantially radial cam surface 452, the contour of which is shown in dotted lines in Fig. 9, cooperating with one or the other of the conical rolls 356, 358 on the escapement pendulum. This cam 450 is pressed by a spring 451 toward the position to render the clutch 346 effective. When, however, the roll 358 (Fig. 14) rides up on the land 453 and then eventually comes into engagement with a stop portion 454 (Fig. 9) of the cam surface 452, this spring 451 is compressed between the slidable cam 450 and the cam 184 on the cam shaft and the clutch 346 opened after a half rotation of the shaft. As soon as the latch 364 is depressed, however, the pendulum swings, the roll 358 is withdrawn and the clutch 346 is closed, whereupon the cam shaft will rotate a half revolution. Before this is completed the swinging of the pendulum brings cam roll 356 against the cam surface, whereupon the roll rides up the curved surface, and stops the cam shaft and abuts the stop surface 454 upon the cam, thus relieving the drive of the friction clutch 346.

The lubrication of the parts contained within the control box 36 is effected by means of an oil pump 456 (Fig. 14) which circulates the oil from a sump 458 through suitable pipes 460, delivering oil to those portions which require lubrication.

*Coupler*

In Fig. 15 is shown the actual construction of the coupler 38 interposed between the coupling shaft 240 and the shaft 150 (Figs. 3 and 5) which is arranged to rotate the cage containing the fuse-setting jaws. The coupling shaft 240 carrying the slightly helical gear 239 is slidable axially for a short distance within a sleeve 462 carried in the rear wall of the control box 36. This coupling shaft 240 is hollowed to receive a spring 464 and a thrust plunger 466 resting against the spring. This plunger has an antifriction ball 468 which rests against a head of a pin 470 positioned in the casting 472 at the end of which the lower end of the vertical shaft 334 is supported. The force of the spring 464 is received by a thrust bearing 474. At its outer, and hence its rear, end, the coupling shaft 240 has external teeth 476 having tapered ends. At the end of the counter recoil, these teeth are adapted to be received between the teeth 478 formed on the inside of a cup 480 splined to the shaft 150 and spring-pressed forwardly by a surrounding spring 482.

In case the teeth 476 do not freely enter the spaces between the teeth 478 but meet end to end, then the spring 464 will allow a slight endwise movement of the shaft 240, and its gear 239, having slightly helical teeth, will slide on the teeth of the meshing gear and impart a fraction of a turn to the shaft 240. This will disturb the end-to-end engagement of the teeth and force the shaft 240 to slip into mesh with the cup 480.

SEQUENCE OF OPERATIONS

Assuming that the gun is in battery position with the breechblock lowered, the fuse-setter jaws closed and the feed-roll brackets swung in, so that the rolls are ready to engage a shell, a round is presented to the gun, being entered between the feed rolls under the guidance of the supporting roll 64 at the rear end, whereupon it will be seized by the first set of feed rolls which are rotating at a low speed, of the order of 200 R. P. M. As soon as the shell strikes and is stopped by the fuse-setting jaws, the feed rolls stall, slipping the clutch 178 and causing the differential 190 to operate. This serves to turn the overriding clutch 205 counterclockwise as viewed in Fig. 8, thereby to turn the shaft 236 (Figs. 8 and 16). This partial rotation of shaft 236 acts through rack 300 and bell crank 302 to release pin 306 from the notch 304, thus allowing the shipper 308 to be actuated by spring 322 to thrust the data pin 292 forward. Substantially simultaneously the zero stop lug 234 is disengaged from the shoulder 232 on the fuse-clutch-release plate, or controller, 222. The wrap-around spring clutch 224 then is able to turn the controller 222 counterclockwise until the shoulder 232 contacts the data pin 292. In this turning movement of the controller 222 and clutch 224, the shaft 220 will be fractionally rotated also and, through the coupling 38 and the shaft 150, will set the fuse. When the shoulder 232 bangs against this data pin 292, it turns the input-data worm gear 290 slightly, sliding the data shaft 282 sufficiently (about a half inch) to turn the vertical shaft 334 and, by the cam 344, to unlatch the escapement.

At this time, the cam shaft 186 turns through a half revolution, whereupon the speed shipper 182 opens the low-speed driving clutch 178 and closes the high-speed driving clutch 180 so that the feed rolls turn at higher speed, such as 1100 R. P. M. At the same time, the action of the cam 318, which is on the cam shaft, will be to pull the data pin 292 out of engagement with the controller shoulder 232, and the eccentric 390 will release the fuse-setting jaws. As soon as the data pin 292 is pulled aside, the fuse-clutch-release plate, or controller, 222 will be free to turn until the shoulder 232 comes back to its starting position, forcibly striking the zero stop lug 234. This will shift axially the shaft 236, the rack 330 and turn the gear 332 to return the worm 288, and hence the data pin 292, to its preset starting position. This movement is retarded by the action of the corresponding dash-pot 342.

The fuse-setter jaws having been withdrawn and the feed rolls driven at high speed, the round is carried forward into the gun. In so doing, the breechblock will be closed, as described heretofore. The firing pin 489 may then be operated and, as the shot is fired, the gun will start to recoil. This will disengage the clutch 40 which drives the feed rolls, thereby allowing them to slow down and, at the same time, the spring 86 will be effective to swing the feed rolls open.

As soon as the gun starts to recoil, a spring within the counter-recoil-buffer cylinder expels the counter-recoil-buffer rod 428, whereupon the movement of the block cam 424 on this rod will be effective to reset the escapement pendulum 352. This will cause the cam shaft to turn through a second half revolution, operating the speed shipper to close the low-speed drive clutch 178 and, working through the eccentric 390, to project the rod 400 rearwardly from the control box. Also, cam 318 will push the link 314 rearward to allow latch 302 to return behind pin 306, thus resetting the data pin 292 and withdrawing it from the path of stop 232, ready to be released when latch 302 is again withdrawn.

During counter-recoil, the breechblock will open and the empty shell will be ejected, passing between the then separated fuse-setter jaws (Fig. 7) and the feed rolls, separated as in Fig. 6. Then, at the end of counter-recoil, the fuse-setter jaws will be closed by the engagement of the rod 402 with the projecting rod 400. Similarly, rod 94 of the ramming mechanism will strike the abutment 112 on the control box 36, and the ramming will be moved inwardly to operative position, turning at low speed as the parts of clutch 40 reengage.

If, on the other hand, the control handle 438 has been moved into position for firing armor-piercing shells, then, at the end of counter-recoil, the feed rolls will start turning at high speed. During the recoil of the gun, the spring-pressed counter-recoil buffer rod 428 operates through the cam 424 to reset the escapement pendulum to its low-speed position. However, under these conditions, the latch at that time is being held out of position to hold the pendulum by reason of the fact that the cam 344 is still depressing the trigger pin 370. Consequently, during counter-recoil, the escapement pendulum is allowed to return to the high-speed position under the action of its spring 384. As a result of these movements of the pendulum, the cam shaft goes through two half revolutions, the first half during recoil and the second half during counter-recoil. This action, however, does not affect the control mechanism because the movements of the shipper 182 are ineffective to cause any change in the speed of the feed rolls due to the fact that the portions of the clutch 40 are separated. Similarly, the rod 400 may be moved without affecting the fuse setter, because of that separation. Since the feed rolls cannot be stalled at that time by reason of the fact that there is no shell in engagement with the fuse setter, such a change from high speed to low speed will have no effect on the connecting rod 248, and the swinging lever 316 will have no effect upon the shipper 308 because the latter will then be latched in its inoperative position and the movement of the lever will be taken up in the slot 320 of the connecting link.

Having described our invention, what we claim as new and desire to secure by Letters Patent of the United States is:

1. In combination, a breech-loading gun, a ramming device for passing a round of ammunition along a path terminating in the gun barrel, a fuse setter constructed and arranged to interrupt the movement of the ammunition in that path and thereby to stall the ramming device, automatic means responsive to the stalling of said device for operating the fuse setter through a predetermined path to set the fuse, means for terminating the interruption caused by the fuse setter, and automatic means for completing the ramming operation at a higher speed.

2. In combination, a breech-loading gun having a displaceable breechblock, a fuse setter adjacent to the breech of the gun, a ramming mechanism alined therewith, means for operating said ramming mechanism to deliver a round of ammunition to the fuse setter and thence to the gun, means for operating the fuse setter to set the fuse comprising means for stopping a round at the fuse setter and for maintaining it in that position during the fuse-setting operation, said first operating means acting subsequently to actuate the ramming mechanism to complete the operation by passing the round into the gun, and means for automatically closing said breechblock.

3. In combination, a breech-loading gun having a displaceable breechblock, a fuse-setting device surrounding the path of movement of a round of ammunition presented to the gun, feed rolls for delivering the round to the fuse-setting device and for subsequently ramming the round into the gun, parts of said fuse-setting device in one position being in the path of said round and thereby operative to stall said feed rolls, control mechanism for driving said feed rolls at a low speed as they present the round to the fuse setter, means forming a part of said control mechanism and responsive to the stalling of the feed rolls when the round engages the fuse setter for starting the fuse-setting movement, said control mechanism also including means responsive to the completion of the fuse-setting operation for driving said feed rolls at a high speed to complete the ramming operation by delivering the round to the gun, and automatic means for closing the breechblock upon the arrival of the round in the gun.

4. In combination, a breech-loading gun, a driven fuse-setting and ramming mechanism secured to the breech of the gun, said ramming mechanism passing a round of ammunition along an unbroken path leading to the breech of the gun, and a preset control mechanism connected to and determining the operation of the fuse-setting and ramming mechanism, automatically to set the fuse of said round of ammunition while the latter is in the path of the ramming mechanism and before it is delivered to the gun.

5. In combination, a gun support, a gun slidably mounted on the support for recoil movement, a fuse-setting mechanism, a ramming mechanism for presenting a round of ammunition to said fuse-setting mechanism, said mechanisms being supported in tandem relation to one another on the breech of the gun for recoil movement therewith, a power-operated control mechanism on the gun support for driving said fuse-setting and ramming mechanisms, and separable means for transmitting power from said control mechanism to the fuse-setting and ramming mechanisms when the gun is in battery position, said control mechanism operating automatically to cause the fuse-setting and ramming mechanisms to act successively to present a round of ammunition to the fuse setter, to set the fuse, and then to deliver the round by a continued movement in the same direction into the breech of the gun.

6. In combination, a breech-loading gun and fuse-setting and ramming devices mounted on said gun, said devices being constructed and arranged to act successively upon a round moved by the ramming devices in a single direction along an unbroken straight path alined at its terminus with the bore of the gun and to act upon the round to set the fuse while it is in that path.

7. In combination, a breech-loading gun having a breech ring and a displaceable breechblock, successively acting, alined fuse-setting and ramming devices secured one behind the other to said breech ring, and means for driving said devices operative to cause their successive operation on the round while it lies in an unbroken path terminating in the barrel of the gun.

8. In a breech-loading gun, a rotatable annular fuse-setter mechanism open at both ends and alined with the bore of the gun, said mechanism comprising withdrawable round-engaging members engageable with a round of ammunition while it is outside of and is alined with the bore of the gun, and means for rotating the mechanism to set the fuse and for then withdrawing said members to permit the round to be moved through them into the gun.

9. In combination, a gun support, a gun slidably mounted on the support for recoil movement, a fuse-setter device and a ramming device, means for supporting said devices on the gun for recoil movement therewith and for engagement with a round of ammunition to set the fuse and to carry the round from the fuse setter into the gun, and a motor mounted on the support separably connected to said devices to operate them prior to the recoil movement.

10. In combination, a gun support, a gun slidably mounted thereon for recoil movement, a fuse-setting mechanism mounted on said gun and arranged for operation upon a round moving along a path alined with the bore of the gun, a ramming mechanism mounted on said gun adjacent to the fuse-setting mechanism and on the side thereof away from the gun, said ramming mechanism operating to carry the round along said path to the gun, said mechanisms operating successively on the same round, a source of power mounted on the gun support, and separable clutches for connecting said source to said mechanisms, said clutches being separated during the recoil movement.

11. In combination, a gun support, a gun slidably mounted on the support for recoil movement, a fuse-setting device on said gun for recoil therewith, a source of power mounted on said gun support, and a control mechanism also mounted on the support and constructed and arranged to connect said source of power to the fuse-setting device when a round is presented to the latter, said control mechanism being arranged to effect a predetermined operation of the fuse-setting device before the gun recoils.

12. In combination, a fuse setter, a driven ramming device for pressing a shell against said fuse setter, a source of power, and a slip drive interposed between said source of power and the ramming device, whereby the ramming device may force a shell against the fuse setter and then stall during the fuse-setting operation.

13. In a breech-loading gun, mounted for recoil movement, and to which a round of ammunition may be presented along a path alined with the bore of the gun, a fuse-setting device and a ramming device each having round-engaging members positioned alongside that path and movable toward and away from the path, and means set in operation by the recoil of the gun for moving said round-engaging members out of said path to permit the ejection of the cartridge case.

14. In a breech-loading gun having a displaceable breechblock, a fuse-setting mechanism positioned outside the gun, said fuse-setting mechanism having a rotatable device including a displaceable round-engaging part movable into and out of the path of the round, means to operate said fuse-setting mechanism to set the fuse and to move the round-engaging part out of the path of the round, a ramming mechanism to present a round of ammunition to said mechanism and then to pass it forwardly into the gun along a path alined at its terminus with the bore of the gun, driven means to operate said mechanisms in a predetermined sequence, and means to close the breechblock.

15. In a device for ramming a round of ammunition into a gun, a pair of carriers swingably mounted upon said gun, feed rolls on said carriers coacting with the sides of a round of ammunition, means for driving said feed rolls in any position of swinging movement, means for interconnecting the feed-roll carriers, and a spring operating upon said interconnecting means for pressing said rolls against the ammunition to be fed.

16. In a gun mounted for recoil with respect to its support, a swinging carrier mounted on the gun, a feed roll pivoted on said carrier and adapted to contact with the surface of a round of ammunition to force it into the gun, means for driving said feed roll when the gun is in battery position, and a spring-operated rod connected to said feed-roll carrier, said spring being biased to move the feed roll away from the ammunition, said rod being positioned upon the gun for engagement with a member on the gun support and arranged to compress said spring and to move the feed roll toward the ammunition when the gun is in battery position and to allow the spring to move the feed roll laterally of the bore of the gun at recoil.

17. In a gun movably mounted on a support for recoil, swinging carriers on the gun disposed laterally of the axis of the gun, feed rolls on said carriers, means for driving said feed rolls, a push rod parallel to the axis of the gun with one end touching the support when the gun is in battery position, means interconnecting the feed-roll carriers slidably mounted on said rod, a stop on the rod at one side of the interconnecting means, a spring surrounding the rod and bearing against the other side of said interconnecting means to cause the feed rolls yieldably to engage the ammunition, and another spring urging said rod, when it is spaced from the support during recoil, to a position to bring said stop against the interconnecting means, thereby to throw said feed rolls away from the axis of the gun.

18. In a gun mounted on its support for recoil, a driving device mounted upon a fixed portion of the gun support, a drive shaft journaled on the gun parallel to its axis, swinging carriers pivoted on said gun and disposed upon opposite sides of the axis, a feed roll on each carrier, jack shafts at the pivots of the carriers and geared to the feed rolls, pinions interconnecting said jack shafts, a connection between the drive shaft and one of said jack shafts, and a separable clutch interposed between the driving device and the drive shaft.

19. In a breech-loading gun for rounds of ammunition having fuse rings, a fuse-setter mechanism surrounding the axis of the gun and provided with a fuse-ring-engaging member swingably mounted for movement toward and away from the axis of the bore of the gun, means for rotating the fuse setter, including its ring-engaging member, around the axis of the gun, a frictionally driven feed roll engaging a round presented to the gun, to hold its ring against said fuse-ring-engaging member, and means for moving the ring-engaging member away from the axis of the gun to permit the feed roll to advance the round.

20. In a breech-loading gun, a fuse-setter mechanism revoluble around the axis of the gun and positioned on the gun back of the breech, shell-feeding mechanism back of the fuse-setter mechanism, slip means for driving said shell-feeding mechanism to feed the shell into the fuse setter and capable of stalling while the fuse setter is operated, and means for rotating the fuse setter a predetermined amount and then releasing the shell, said feeding mechanism being then operable to carry the shell past the fuse setter and into the breech of the gun.

21. In a fuse setter for a breech-loading gun, a fuse-setter mechanism having the axis of a shell presented thereto positioned in alinement with the bore of a gun and comprising an annular cage rotatable about the axis of the shell to set a fuse, a fuse-engaging member pivoted in said cage, a gear-operated mechanism connected to said member in any position of rotation to move it toward and away from said axis, and a gear-operated mechanism connected to said cage to rotate it.

22. In a breech-loading gun, a fuse-setter mechanism comprising a shell-engaging member movable into a path alined with the bore of the gun, a feed mechanism driven to push a shell into engagement with said shell-engaging member, means for rotating the fuse setter, and a device for disengaging the member from the shell by movement away from the axis of the gun, said feed mechanism being then operative to ram the shell into the breech of the gun.

23. In a fuse setter for a breech-loading gun, a fuse-setter mechanism having the axis of a shell presented thereto positioned in alinement with the bore of a gun and comprising an annular cage rotatable about the shell axis to set a fuse, arms pivoted in said cage for engagement with the fuse-adjusting member of a shell presented thereto, a ring slidable on the outside of said cage in a direction parallel to said axis, links connecting said arms to said ring, gear means for rotating the cage, and means for sliding said ring.

24. A fuse-setting mechanism comprising a rotatable member provided with a fuse-engaging device mounted thereon for substantially radial movement, a member slidable axially of said rotatable member and arranged to move said fuse-engaging device laterally toward and away from a round of ammunition presented thereto, means to rotate said first member to set the fuse of said round, and automatic means for effecting a relative sliding movement of said members to disengage the fuse-engaging device from the round of ammunition.

25. In a fuse setter, a fuse-setter mechanism comprising an annular cage rotatable about the axis of a round presented thereto to set a fuse, a ring surrounding said cage and slidable thereon in a direction parallel to said axis, and a fuse-engaging device mounted on the cage and operated by said sliding ring, means for rotating the cage and said device, and means for sliding said ring operative in any position of rotation of the cage.

26. A fuse-setting mechanism having a through passage arranged to receive and permit the movement therethrough of a round of ammunition, said mechanism comprising a rotatably mounted annular cage surrounding said passage, a member on said cage movable into said passage, for engaging the fuse-adjusting member of a shell presented thereto, means to withdraw the member on the cage after the fuse has been set to permit forward movement of the round in the direction of the movement of presentation, and means for supporting said cage for rotation, said cage including a member connected to the cage and provided with gear teeth by means of which power for the rotation of the cage may be supplied.

27. A fuse-setting mechanism comprising a rotatably mounted cage, a retractile member supported in said cage for movement into and out of engagement with the fuse-adjusting member of a shell presented thereto, means for moving said retractile member toward and away from the shell comprising a ring slidable upon the cage, a circular rack on said ring, and a plurality of interconnected pinions engaging said rack at points spaced around its circumference to slide the ring and cause engagement of the retractile member with the shell.

28. In a fuse-setting mechanism, a rotatably mounted cage comprising side plates one of which has peripheral teeth for engagement with a pinion by means of which the cage is rotated, a body member engaged between said side plates, arms pivoted in said body member and adapted to engage the fuse-adjusting member in a shell presented thereto, a ring slidably mounted on said body member between said side plates, links connecting said ring with said arms, and a circular rack on said ring by which the ring may be slid to withdraw or present the arms.

29. In a fuse setter, a hollow cage rotatable about a longitudinal axis, arms pivoted in said cage, knife-edged disks at the inner ends of said arms for engagement with the fuse-adjusting member of a shell presented to the fuse setter, an actuator movable on the cage, links interposed between said actuator and said arms and movable by the actuator to positions normal to said axis in order to hold said arms positively in engagement with the fuse-adjusting member, and means for rotating the cage, said actuator being also movable to tilt the links to retract the arms.

30. In a fuse setter adapted to be mounted upon the rear end of a gun, a cage rotatable about the axis of the gun, a ring slidable on said cage in a direction parallel to the axis of the gun, fuse-setting members mounted on said cage for movement toward and away from the axis of the gun, connections between said slidable ring and said members for moving them, said ring having a series of circumferential grooves constituting a continuous rack, means for rotating the cage to set the fuse, and mechanism including a pinion engaging said rack for sliding the ring to engage and disengage the fuse-setting members with a shell presented to them.

31. In a fuse setter, an annular cage the inner diameter of which is larger than the outer diameter of a shell presented thereto, a plurality of arms pivoted in said cage for movement toward and away from a shell the fuse of which is to be set, said arms swinging in radial planes intersecting the axis of the shell, means for holding the arms in engagement with the shell, and means for retracting the arms to positions outside the inner diameter of the cage to permit the shell to be moved through the fuse setter into the gun.

32. In a gun mounted for recoil movement with respect to its support, a hollow fuse setter mounted on the gun, said fuse setter having a passage the inner diameter of which is larger than the outer diameter of a shell presented thereto in alinement with the bore of the gun and provided with inwardly swingable arms for engagement with the fuse-adjusting member of a shell presented to the gun, spring-operated means for withdrawing said arms to inoperative positions outside the passage to permit the shell to be moved through the fuse setter into the gun, said spring-operated means being positioned for engagement with said support to move said arms into operative position in opposition to said spring when the gun returns to battery position.

33. In a gun mounted for recoil with respect to its support, a fuse-rotating mechanism mounted upon the gun, a driving motor mounted upon the gun support, and means for rotating said mechanism through a predetermined arc, comprising a separable clutch interposed between said motor and said fuse-rotating mechanism, said clutch having positively-engaging clutch members adapted to be brought together in any one of a plurality of positions.

34. In a gun mounted for recoil with respect to its support, a fuse-rotating mechanism mounted upon the gun, a driving motor mounted upon the gun support, means for rotating said fuse-rotating mechanism through a predetermined arc, comprising a separable clutch interposed between said motor and said fuse-rotating mechanism, said clutch having multifingered, positively-engaging clutch members adapted to be brought together in any one of a plurality of positions, and yieldable torsion means interposed between one of said clutch members and its associated mechanism, operative in case of engagement of the ends of the fingers of the respective clutch members to turn one member till the fingers interlock.

35. A ramming and fuse-setting mechanism including feed rolls and a fuse setter, a low-speed drive for said feed rolls to push the shell into engagement with the fuse setter, a friction clutch in said drive, thereby permitting the feed rolls to stall, an overriding clutch, a differential interposed between the latter and said low-speed drive, and means operated by reversal of said overriding clutch by the differential for releasing said fuse setter for movement through a predetermined distance.

36. In a breech-loading gun, shell-feeding and fuse-setting mechanisms, said fuse-setting mechanism including displaceable members engageable with and mounted for movement to set a fuse-adjusting member on a shell, a stop for said mechanism to discontinue the setting movement, means for setting said stop in a predetermined position in accordance with the fuse-setting desired, releasable means for moving said fuse-setter mechanism, cam-controlled means for withdrawing the displaceable members, and means operated by the reaction of the stop to the blow of the setting mechanism for starting operation of said cam-controlled means.

37. In a breech-loading gun mounted for recoil with respect to its support and having automatic mechanism to open the breechblock during counterrecoil, a combination fuse-setting and round-feeding mechanism adapted to be mounted upon said gun in alinement with the bore thereof, the feeding mechanism and the fuse setter having round-engaging members movable from outer positions outside the path of a round presented to the gun to inner positions in engagement with the round, and loaded spring-operated means released by the recoil movement of the gun for withdrawing the round-engaging members out of said path to permit the cartridge case to be expelled from the breech of the gun past said members.

38. In combination, a fuse-setting mechanism, a power shaft, feed rolls, a low-speed and high-speed drive mechanism interposed between said power shaft and said feed rolls, cam-operated means for controlling said mechanisms, said fuse-setting mechanism having round-engaging members movable into engagement with a round to stop the movement of the round presented to it by the feed rolls and being capable of stalling said feed rolls when the round reaches the fuse setter, a device to move the members, an overriding clutch connected to the fuse-setting mechanism, a differential interposed between the low-speed feed-roll drive and said overriding clutch, said clutch being operable by reversal of said differential and effective to start the operation of the fuse setter, and means responsive to the completion of the fuse setting operable to operate the member-moving device to carry the latter away from the round and to control said cam mechanism to connect the high-speed drive to the feed rolls.

39. In a combined ramming and fuse-setting mechanism, feed rolls, a fuse setter positioned to stop and operate upon a round being moved toward the gun by the feed rolls while the latter still engage the round, thereby stalling said rolls, trigger-released mechanism for driving the fuse setter, and means responsive to the stalling of said feed rolls for releasing said trigger.

40. In a combined ramming and fuse-setting mechanism, feed rolls, a fuse setter positioned to stop and operate upon a round being moved toward the gun by said rolls while the latter still engage the round, thereby stalling said rolls, a drive shaft for said feed rolls, an overriding ratchet mechanism on said shaft, a trigger-released mechanism arranged to drive the fuse setter, a connection between said ratchet and said trigger-released mechanism, and a differential and a slip clutch interposed between said shaft and said ratchet mechanism, whereby the stalling of the feed-roll drive shaft is effective to operate the ratchet mechanism to start the fuse setter in operation.

41. In controls for fuse-setting mechanisms, a shaft for operating the fuse-setting mechanisms, a clutch mechanism arranged to transmit power to rotate said fuse-setting shaft, said mechanism embodying a controller rotatable therewith and constructed and arranged to render the clutch effective, a stop shoulder on said controller, a releasable zero stop engaging said shoulder, a preset data pin in line with the path of movement of said shoulder, and means effective substantially when the round engages the fuse-setting mechanism for withdrawing said zero stop to release said controller to rotate until it contacts with said data pin, carrying with it the fuse-setting shaft.

42. In a fuse-setting mechanism, a fuse-setting shaft, power means including a friction clutch for rotating said shaft, a shouldered controller on the shaft releasably held stationary and arranged to be driven through said clutch, when released, to rotate the shaft, a preset data pin adapted to be positioned in the path of said shoulder when the latter moves, to cause the clutch to slip after a predetermined rotation and thereby to determine the extent of movement of the fuse-setting shaft, and means for withdrawing said data pin from engagement with said shoulder to permit the controller to rotate further so as to reset it.

43. In a fuse-setting mechanism, a setting device surrounding a path of movement of the ammunition, said device embodying fuse-ring-engaging jaws mounted for movement into and out of that path and a fuse-setting shaft connected thereto, a data pin for determining the extent of movement of the fuse-setting shaft, a worm gear carrying said pin, means for presetting said data pin including a worm coacting with said worm gear, a releasable shouldered controller which, when driven, operates the fuse-setting shaft, said controller being rotatable with the shaft to bring its shoulder into engagement with said data pin, and power-operated mechanism set in motion by the reaction of said data pin acting through said gear and worm subsequently to cause withdrawal of the jaws of the fuse setter.

44. In a fuse-setting mechanism, a fuse-setting shaft, means including a clutch for connecting said shaft to a source of power, said clutch having a member controlling engagement and disengagement thereof and rotatable with the shaft when the clutch is engaged, said controlling member having a shoulder, releasable zero-stop means contacting the shoulder of the controlling member at one point to release the clutch and to hold the controlling member stationary, said controlling member, when released, closing said clutch to cause rotation of said shaft, a preset data pin movable into the path of rotation of said shoulder to release the clutch and to determine the extent of such revolution, and trigger-operated mechanism for releasing said zero-stop means and immediately moving said data pin into the path of movement of the shoulder, thereby to stop its rotation and determine the setting of the fuse.

45. In a fuse-setting mechanism, a fuse-setting shaft, means including a clutch for rotating said shaft, said clutch having a member controlling engagement and disengagement thereof and rotatable with the shaft when the clutch is engaged, said controlling member having a shoulder, releasable zero stop means contacting the shoulder of the controlling member at one point to release the clutch and to hold said shaft initially against rotation with said clutch disengaged, means for releasing said stop means to cause the clutch to be engaged and hence to start rotation of said fuse-setting shaft, and means arranged for engagement with said controlling member at any other selected point in its rotative movement to disengage said clutch and to stop the rotation of said fuse-setting shaft, thereby to determine the setting of the fuse.

46. In a fuse-setting mechanism, a controller mounted for movement in a predetermined path to determine the setting of a fuse, said controller having a shoulder, a data pin movable into and out of the path of said shoulder, means for adjustably supporting said data pin to determine its relation to the shoulder, and a release for said controller operative also to move the data pin into the path of the shoulder.

47. In a fuse-setting mechanism, a fuse-setting shaft, a controller determining the extent of rotation of the shaft, a friction clutch for driving the controller, a data pin movable into the path of movement of the controller, a latch holding said data pin out of said path, means for releasing said latch, and means responsive to the reaction of the controller on the data pin at the termination of the fuse-setting movement constructed and arranged to effect the recocking of said latch.

48. In a fuse-setting mechanism, a fuse-setting shaft, a controller having a shoulder and arranged to determine the extent of rotative movement of said shaft, a zero stop coacting with said shoulder to determine the starting position of said controller, a source of power, a friction clutch driven from said source for rotating said fuse-setter shaft when the controller is released, and means including a cam on said shaft effective when the controller again strikes the zero stop to relieve the drag of said friction clutch.

49. In a fuse-setting mechanism, a fuse setting shaft, a trigger mechanism, a clutch for delivering power to rotate said shaft when released by said mechanism, a controller for said clutch rotatable with the shaft and arranged to determine the extent of rotation thereof and hence the particular setting of the fuse, a data pin movable into and out of the path of movement of said controller, a cam shaft, an escapement permitting successive partial rotations of the cam shaft, means operated by the trigger mechanism for moving the data pin into the path of movement of the controller, means, operable by the reaction of the data pin when engaged by the controller, actuating said escapement to cause a partial rotation of the cam shaft, and means operated by said cam shaft to withdraw said data pin, permitting the fuse-setting device to return to its zero position.

50. In a fuse-setting mechanism, a fuse-setting shaft, a fuse-setting controller rotatable with said shaft and arranged to determine the extent of rotation thereof and hence the particular setting of the fuse, a worm gear on the shaft having a data stop mounted thereon for movement toward and away from the controller, parallel shafts adjacent to said fuse-setting shaft, said parallel shafts being interconnected for opposite axial movement, one of said parallel shafts having a zero stop movable thereon releasably to engage said controller, the other of said parallel shafts having a worm meshing with said worm gear and rotatable to determine the setting of the data stop, a shipper for moving said data stop into and out of the path of movement of the controller, a spring acting upon said shipper, and means, for releasing said shipper to the action of the spring, connected to the shaft carrying the zero stop, whereby withdrawal of the zero stop is accompanied by movement of the data stop into the path of movement of the controller.

51. In a fuse-setting mechanism, a device for engaging a fuse-setting ring on a round of ammunition, an operating shaft therefor, a coupling shaft in alinement with said operating shaft, a toothed coupling having portions secured to the respective shafts and arranged for endwise engagement, means for determining the setting of the fuse including a shaft connected to said coupling shaft by helical gears, said gear-connected shaft being axially yieldable, whereby end-to-end engagement of the coupler teeth will cause a rotation of said gear-connected shaft to move one set of coupler teeth out of end-to-end engagement with the other set to permit connection of the coupler.

52. In a fuse-setting mechanism, a setting shaft having a rotatable controller and a settable data stop for said controller, shafts adjacent thereto having a whiffletree connection, one of said shafts having a zero stop cooperating with the controller and the other shaft being connected to the data stop, and a two-way hydraulic check joined to said whiffletree connection, thereby to soften the reactions of the zero stop and the data stop as they are contacted successively by the controller.

53. In a fuse-setting mechanism, a fuse-setting shaft, withdrawable stop members coacting with said shaft to determine the start and stop of the setting of the fuse, parallel auxiliary shafts having a whiffletree connection, said stop members being movable with the latter shafts, a cam shaft, a connection therefrom to one of the stop members, a mechanism to control rotation of the cam shaft, and means joined to said whiffletree connection for releasing said control mechanism, thereby to cause the cam shaft to withdraw one of said stop members.

54. In a fuse-setting mechanism, a cam shaft controlling the setting and resetting of a withdrawable data pin, a drive including a friction clutch part of which is connected to said cam shaft to drive it, an escapement mechanism controlling said friction clutch to produce successive fractional rotations of said cam shaft, said escapement being spring-biased in one direction, a trigger for releasing the escapement, and means for resetting the escapement.

55. In a fuse-setting mechanism, a cam shaft controlling the setting and resetting of a withdrawable data pin, a drive including a friction clutch part of which is connected to said cam shaft to drive it, a swinging escapement controlling said cam shaft clutch, a spring urging said escapement in one direction, and an operator-controlled device for holding said escapement against the action of said spring.

56. In a fuse-setting and ramming mechanism, feed rolls, low-speed and high-speed drives for said feed rolls, said drives operating upon a shell to move it before and after a fuse-setting operation, a cam shaft for shifting from low to high-speed drive, an escapement controlling said cam shaft, and a hand-operated control device for holding said escapement in a position to maintain a high-speed drive when the fuse-setting mechanism is not to be employed.

57. In a fuse-setting mechanism including withdrawable round-engaging members, means to withdraw said members, a cam shaft controlling said means, a drive including a friction clutch part of which is connected to said cam shaft to drive it, a swinging escapement controlling said friction clutch intermittently to render the drive effective to turn the cam shaft, said escapement being spring-biased in one direction, a reciprocable cam for resetting said escapement, means acting intermittently to reciprocate said latter cam, and a thrust bearing for the escapement to resist deflection thereof by the action of the reciprocable cam.

58. A fuse-setting mechanism including withdrawable round-engaging members, means to withdraw said members, and fuse-setting control mechanism including a cam shaft controlling said withdrawing means, a power drive including a friction clutch part of which is connected to said cam shaft to drive it, an escapement pendulum controlling said friction clutch intermittently to render the drive effective to turn the cam shaft, a spring biasing said pendulum in one direction, a latch for holding the pendulum against the spring; an operator-controlled device 438, and alternative latch-operating devices 370 and 448 connected respectively to the fuse-setting control mechanism and to said operator-controlled device.

59. In a ramming mechanism, a rotatable feed roll, a two-speed drive therefor, a cam shaft controlling the two speed drive, a drive for said cam shaft, a cam slidable on the shaft to discontinue said latter drive, said cam having an end face extending transversely to the shaft, an escapement pendulum provided with a ring surrounding the shaft, and opposed cam rolls on the inner side of said ring arranged to engage said end face and discontinue the cam-shaft drive at the end of half revolutions of the cam shaft.

AUGUST DABRASKY.
WILLIAM V. GOODHUE.
GALEN M. TAYLOR.

REFERENCES CITED

The following references are of record in the file of this patent:

UNITED STATES PATENTS

| Number | Name | Date |
| --- | --- | --- |
| 1,307,639 | Redpath et al. | June 24, 1919 |
| 1,332,763 | Schneider | Mar. 2, 1920 |
| 1,349,220 | Morse | Aug. 10, 1920 |
| 1,769,861 | Schuler | July 1, 1930 |
| 1,974,523 | Varaud | Sept. 25, 1934 |
| 2,151,288 | Waninger | Mar. 21, 1939 |
| 2,255,043 | Beatty | Sept. 9, 1941 |

FOREIGN PATENTS

| Number | Country | Date |
| --- | --- | --- |
| 22,105 | France | Dec. 7, 1920 |
| 212,452 | Switzerland | Mar. 3, 1941 |
| 295,311 | Germany | July 5, 1919 |